United States Patent [19]

Yu

[11] Patent Number: 5,225,491

[45] Date of Patent: Jul. 6, 1993

[54] COMB-SHAPED COPOLYMERS OF A MACROMOLECULAR MONOMER OF POLYHALOETHER WITH TERMINAL OLEFINIC UNSATURATION AND PROCESS

[75] Inventor: Simon H. Yu, Westlake, Ohio

[73] Assignee: The B. F. Goodrich Company, Akron, Ohio

[21] Appl. No.: 960,673

[22] Filed: Oct. 14, 1992

Related U.S. Application Data

[60] Division of Ser. No. 895,504, Jun. 8, 1992, Continuation-in-part of Ser. No. 783,944, Oct. 28, 1991, Pat. No. 5,120,790, Continuation-in-part of Ser. No. 638,275, Jan. 7, 1991, Pat. No. 5,061,772, Continuation-in-part of Ser. No. 283,422, Dec. 12, 1988, Pat. No. 4,983,689, Continuation-in-part of Ser. No. 46,818, May 7, 1987, Pat. No. 4,791,189.

[51] Int. Cl.$^5$ .................... C08L 27/04; C08L 33/14
[52] U.S. Cl. .................... 525/213; 525/403; 525/404; 525/421; 525/445; 525/455; 526/292.9
[58] Field of Search ............... 525/213, 403, 404, 421, 525/445, 455; 526/292.9

[56] References Cited

U.S. PATENT DOCUMENTS

| | | | |
|---|---|---|---|
| 4,791,189 | 12/1988 | Yu | 528/355 |
| 4,983,689 | 1/1991 | Yu | 525/412 |
| 5,061,772 | 10/1991 | Yu | 526/320 |
| 5,120,790 | 6/1992 | Yu | 525/186 |

Primary Examiner—Morton Foelak
Attorney, Agent, or Firm—Alfred D. Lobo; George W. Moxon, II

[57] ABSTRACT

This invention relates to a comb-shaped graft copolymer, to a process for making the comb, and to a polymer blend made with the comb. The comb is made by a free radical polymerization of an ethylenically unsaturated monomer with a macromolecular monomer ("macromer" for brevity) of a haloalkylene oxide ("HAO" for brevity) homopolymer, random or block copolymer. The comb copolymer and blends of the comb with a polymer(s) may be cured. A comb with a terminal acrylyl or methacrylyl group or "head" and pendant polyether chains, which always include some HAO repeating units, may be made in an emulsion or suspension polymerization process which provides a comb having adequately high molecular weight so that the comb may be used in blends. The preferred comb of epichlorohydrin has a (meth)acrylyl head at one end, through which it (the macromer) is polymerizable, and a terminal hydroxyl (OH) group, or an end-capping group derived from the OH group at the other end. Each "tine" (pendant chain) of the comb is an uninterrupted one (that is, having no branch) having at least two repeating units derived from a HAO, preferably epichlorohydrin ("ECH"), with the tine terminating with a OH group, or an end-capping group derived from the OH group.

8 Claims, No Drawings

COMB-SHAPED COPOLYMERS OF A MACROMOLECULAR MONOMER OF POLYHALOETHER WITH TERMINAL OLEFINIC UNSATURATION AND PROCESS

This is a division of parent application Ser. No. 07/895,504 filed on Jun. 8, 1992, which is a continuation-in-part application of Ser. No. 783,944 filed Oct. 28, 1991, now U.S. Pat. No. 5,120,790 which is a continuation-in-part application of Ser. No. 638,275 filed Jan. 7, 1991, issued as U.S. Pat. No. 5,061,772, which in turn is a continuation-in-part application of Ser. No. 283,422 filed Dec. 12, 1988, issued as U.S. Pat. No. 4,983,689, which in turn was a continuation-in-part of Ser. No. 046,818 filed May 7, 1987, issued as U.S. Pat. No. 4,791,189 on Dec. 13, 1988.

BACKGROUND OF THE INVENTION

This invention relates to a comb-shaped graft copolymer, (hereafter "comb" for brevity), to a process for making the comb, and to a polymer blend made with the comb. The comb is made by a free radical polymerization of an ethylenically unsaturated monomer with a macromolecular monomer ("macromer" for brevity) of a haloalkylene oxide ("HAO" for brevity) homopolymer, random or block copolymer. The comb copolymer and blends of the comb with a polymer(s) may be cured.

A process for making a comb of a macromer of polylactone with terminal acrylyl unsaturation and compatible blends thereof with another synthetic resinous material (referred to as a "matrix polymer") is disclosed in my U.S. Pat. No. 5,061,772; and blends of a comb copolymer of a macromer having pendant polylactone chains is disclosed in the aforementioned '944 application. I have now found that a comb with a terminal acrylyl or methacrylyl group or "head" and pendant polyether chains, which always include some HAO repeating units, may be made in an emulsion or suspension polymerization process analogous to that used to make the comb in my '772 patent; and, that it is only because an emulsion or suspension polymerization process provides a comb having adequately high molecular weight ("mol wt"), that I can successfully use the comb in the aforementioned blends. An acrylyl or methacrylyl head is referred to herein as a "(meth)acrylyl" head for convenience, and, as more fully described hereafter, is derived from an $\alpha,\beta$-monoolefinically unsaturated alcohol.

More specifically this invention relates to a process for making a comb by free radical polymerization of a macromer of a haloalkylene oxide, optionally in combination with another olefinically unsaturated monomer(s), the macromer having a single (meth)acrylyl head at one end, through which it (the macromer) is polymerizable, and a terminal hydroxyl (OH) group, or an end-capping group derived from the OH group at the other end. Each "tine" (pendant chain) of the comb is an uninterrupted one (that is, having no branch) having at least two repeating units derived from a HAO, preferably epichlorohydrin ("ECH"), with the tine terminating with a OH group, or an end-capping group derived from the OH group.

Macromers of polyether with terminal (meth)acrylyl unsaturation are disclosed in U.S. Pat. No. Re. 31,468 reissued Dec. 20, 1983, to Chin C. Hsu, the disclosure of which is incorporated by reference thereto as if fully set forth herein. Note that Hsu suggested copolymerizing his macromer but did not realize that, because it had a single terminal double bond he would get a comb copolymer. In view of the actual structure, corrected upon reissue, and several disclosures, for example in U.S. Pat. Nos. 4,302,558; 4,332,919; 4,315,081; 4,543,390; 4,604,414; and 4,699,964, relating to making comb copolymers with an acrylyl-headed macromer, particularly of ethylene oxide, it was evident that the Hsu macromer could yield a macromer if it could be made. Since both the Hsu macromer and the monomers used to provide the comb are water-insoluble, the copolymerization is typically run in solution in non-aqueous solvents. The result is a low mol wt comb copolymer having a number average molecular weight less than 100,000. It was therefore all the more surprising that an aqueous polymerization, whether in suspension or emulsion, would yield a comb copolymer of the Hsu macromer which comb would have a mol wt (Mn) greater than 100,000.

Analogous considerations apply to styryl terminated and allyl terminated macromers of polyethers taught in U.S. Pat. Nos. 4,680,358 and 4,722,978 issued July 1987 and February 1988 respectively to Simon Hsiao-Pao Yu. Neither of the macromers nor the monomers used to make the comb copolymers are water-soluble. Each macromer was made in non-aqueous solvents. Yet comb copolymers of each having a mol wt greater than 100,000 are made by suspension or emulsion polymerization.

A macromer, by definition, has only a single olefinic double bond. The macromers used to produce the comb copolymers are insoluble in water, as are the copolymers produced. The blend is of a known matrix polymer, typically one which is commercially available, and which may or may not be cocurable, with the comb chosen for the blend. The macromer may be of either acrylically, styrenically or allylically unsaturated polyether containing plural HAO repeating units, and, in each case the comb is formed with an ethylenically unsaturated monomer (simply "monomer" for brevity).

It is essential that the macromer used to prepare the comb contains at least two, and preferably several repeating units derived from a HAO, because, in addition to providing desirable mechanical compatibility with numerous matrix polymers in which the comb may be blended, halogen atoms in the pendant chains of the comb provide active sites through which the blend is cured. In the specific instance where a comb is made by copolymerizing butyl acrylate with a macromer of polyepichlorohydrin ("MPECH"), the pendant chains of polyepichlorohydrin ("PECH") allow the comb to be compatible with poly(vinyl chloride) (PVC) or chlorinated poly(vinyl chloride) (CPVC); and, the presence of the Cl atoms in the tines allows the comb to be cocured (also sometimes referred to as being "covulcanized") when blended with a homopolymer or copolymer of a HAO such as epichlorohydrin ("ECH").

Polymerization of the (meth)acrylyl-headed macromer to form comb copolymers which are a special form of graft copolymers, differs from conventional graft copolymerization in the sequence of formation of the backbone relative to the formation of the graft unit.

Macromers used in this invention have a Mn in the range from about 300 to about 3000 though even higher mol wts up to about 10,000 may be used, if desired. The term macromer is used herein to denote a prepolymer made from at least one ring-opened HAO with a "(meth)acrylic" head group. If the macromer is formed from a single HAO it is referred to as a "homomacromer"; if from more than one comonomer which appears randomly, it is referred to as a "macromer copolymer"; and, if a copolymer is specifically formed by sequential copolymerization, it is referred to as a "macromer block copolyether".

The macromer is preferably formed by cationic ring-opening polymerization of at least one HAO in conjunction with a hydroxyalkyl (meth)acryate which functions as the generator of the propagating species, and a suitable cationic ring-opening catalyst. The hydroxyalkyl (meth)acrylate, for example, 2-hydroxyethyl acrylate or 2-hydroxyethyl methacrylate is referred to as the "propagator" because its function is to generate the OH group (which is the propagating species), in the presence of a cationic initiator. The macromer has substantially uniform mol wt distribution such that the ratio of the weight average mol wt (Mw) to the number average mol wt (Mn) is not substantially above about 3, preferably less than 2.

The (meth)acrylyl terminated macromer used in this invention is preferably made in a manner analogous to that described in my '358 and '978 patents except that one starts with an alcohol having a terminal (meth)acrylyl group. The (meth)acrylyl head of the alcohol does not undergo carbocationic polymerization under the acidic conditions required for the cationic ring-opening polymerization of the HAO used. The polymerization proceeds by polyaddition of the HAO to the OH group which is the propagating species.

The preferred (meth)acrylyl headed macromer used in the blend of this invention is formed by a process which comprises, polymerizing (A) a cationically ring-openable cyclic ether selected from the group consisting of at lest one haloalkylene oxide, and optionally (i) an alkylene oxide having the structure

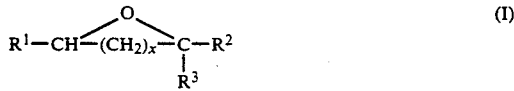

wherein, x is an integer in the range from 0 to about 4, except that when x>1, a second alkylene oxide having x=1 or 0 must be present, and, $R^1$, $R^2$ and $R^3$ are independently selected from the group consisting of hydrogen, $C_1$–$C_{20}$ alkyl (having from 1 to about 20 carbon atoms) and haloalkyl, and, at least one of $R^1$, $R^2$ and $R^3$ is hydrogen; and, (ii) an aliphatic or aromatic glycidyl ether having the structure

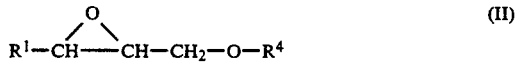

wherein $R^4$ represents a member selected from the group consisting of a substituted hydrocarbon group, i.e. $C_1$–$C_{20}$ alkyl or substituted alkyl, particularly haloalkyl, alkoxyalkyl, aryl (Ar) or substituted aryl (Ar-Q) particularly wherein Q represents $C_1$–$C_{10}$ alkyl or haloalkyl; and, (B) a hydroxyalkyl acrylate represented by the structure

wherein, $R^5$ is H or C1–C20 alkyl, preferably C1–C5 alkyl and most preferably $CH_3$, and, $R^6$ is selected from a saturated group consisting of branched or linear alkylene, haloalkylene, alkoxyalkyl, haloalkoxyalkyl, each $C_1$–$C_{20}$, aralkylene, haloaralkylene, aralkoxyl, and haloaralkoxy, each $C_7$–$C_{20}$; in the presence of an effective amount of (C) a cationic initiator selected from the group consisting of Friedl-Crafts acids, relatively strong protic organic and inorganic acids, oxonium salts and stable carbenium ions; so as to produce a water-insoluble macromer having the structure

wherein R represents the residue of (A),

M represents a repeating unit of at least one haloalkylene oxide which is ring-opened and the HAO is present in an amount in the range from 50% to 100% in the macromer, and, m represents an integer in the range from 2 to about 500, more preferably from 2 to about 300.

The preferred styryl-headed macromer used in the blend is formed in an analogous manner by using a styrylically unsaturated primary or secondary alcohol wherein the ethylenic unsaturation is adjacent to an aromatic ring, represented by the structure

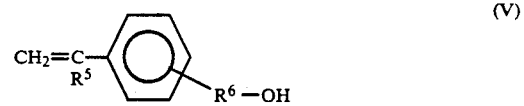

The preferred allyl-headed macromer used in the blend is formed in an analogous manner by using an allylically unsaturated primary or secondary alcohol wherein the ethylenic unsaturation is adjacent to a saturated carbon atom, represented by the aliphatic structure

In a manner analogous to that described in my '358 and '978 patents, a macromer block copolyether may be prepared by polymerizing plural cyclic ethers sequentially, by using the macromer as a propagator, so as to have the structure

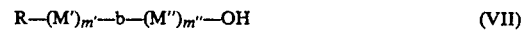

wherein M' and M" represent two ring-opened cyclic ethers, and at least one is a HAO; and, m' and m" are integers each in the range from 1 to about 300 such that m'+m"=m.

The HAO is selected from the group consisting of a haloalkyl epoxide, haloalkaryl epoxide, haloalkyl glycidyl ether, and haloalkaryl glycidyl ether. Preferred haloalkyl epoxides are epichlorohydrin, epibromohydrin, epiiodohydrin, epifluorohydrin, 3-chloro-1,2-epoxybutane, 3-chloro-2,3-epoxybutane, 3,3-dichloro- 1,2-epoxypropane, and 3,3,3-trichloro-1,2-epoxypropane. A preferred haloalkaryl epoxide is chloromethylphenylene oxide. Preferred haloalkyl glycidyl ethers are 1,1-bis(chloromethyl)ethyl glycidyl ether, 2-chloroethyl glycidyl ether, 2-bromoethyl glycidyl ether, 2,2,2-trichloromethyl ethyl glycidyl ether. A preferred haloalkaryl glycidyl ether is chloromethyphenyl glycidyl ether. The most preferred HAO is epichlorohydrin.

The critical importance of having repeating units derived from a HAO in a pendant chain of copolymer of the macromer is that each of the chains provides active sites (Cl atoms) through which the chains may be cured or co-cured if desired. Another point of critical importance is that the pendant chains of the comb copolymer are compatible with many matrix polymers. The chains of the comb copolymer may be cured; or, a mixture of combs having active halogen sites may be co-cured; or, a comb may be co-cured with a polymer having active halogen sites such as a homopolymer or copolymer of ECH, of chlorinated polyethylene or of poly(chloroprene).

This invention relates to using the water-insoluble macromer, whether homomacromer, or, macromer of random or block copolyether, to prepare a comb copolymer of the macromer which either by itself, or more preferably, with a wide array of monomers, is used for the specific purpose of forming either a non-curable blend with a matrix polymer, or, a blend which is co-curable with a matrix polymer.

The properties of the comb, cured by itself, or not cured, may be tailored by choosing the polyether components of the macromer, the monomer with which the macromer is to be copolymerized to form the comb, and the ratio of the monomer to the macromer. Yet another degree of flexibility is obtained by curing a mixture of combs in which the pendant chains may be the same or different, and the comonomers used to form each of the combs may be the same or different.

The properties of an uncured blend of a comb with a matrix polymer, may be tailored by choosing the comb with a first set of desirable properties, and the matrix polymer with another set of desirable properties not possessed by the comb copolymer. Analogously, the cured blend of a comb with a matrix polymer is tailored by choosing a comb with a first set of desirable properties, and the matrix polymer with another set of desirable properties not possessed by the comb. It is thus possible to obtain a hybrid blend with the desirable properties of both the comb and the non-curable or co-curable polymer. The curing of the blend may take place after mixing, or during dynamic mixing.

Curing through the halogen atoms, especially chlorine atoms, is well known in the art. Most commonly the comb copolymer, by itself or as a blend, can be cured by a diamine, a thiourea, or an imidazole curing agent. Of thioureas available, ethylene thiourea is the most widely used. Of diamines available, hexamethylene diamine carbamate (Diak No. 1 from DuPont) and piperazine hexahydrate are the most widely used. Generally an acid acceptor, such as red lead or magnesium oxide, is required in the cure system. If desirable, plastiizers, lubricants, processing aids and stabilizers may also be included in the cure system.

More specifically, cured homopolymers and copolymers ECH, commercially available under the HYDRIN ® trademark (of The B. F. Goodrich Company), are known to have excellent resistance to degradation by ozone, water and hydrocarbon fuels, particularly gasoline and jet fuel. These cured polymers also have excellent gas transmission resistance; a bladder of PECH filled with air, chlorine or methane under pressure, does not lose a significant amount of pressure even over a very long period provided the temperature is not raised above about 100° C.

Cured acrylate homopolymers and copolymers, such as those sold under the HyTemp trademark (of The B. F. Goodrich Company) on the other hand, can easily withstand temperatures as high as about 200° C. and are oil- and water-resistant, but have poor resistance to hydrocarbon fuels; they also have poor resistance to gas transmission.

By curing a blend of the comb copolymer (of acrylic monomer(s) and macromer of PECH) and PECH, a co-curable hybrid blend is obtained which has the desirable properties of both polymer components blended into it; and the degree to which the properties of the hybrid blend approach the properties of the hydrocarbon backbone or the polyether pendant chains can be adjusted by choosing the ratio of polyether units in the blend.

In the past, attempts made to co-cure blends of PECH and an acrylic elastomer met with limited success. See A. C. Fernandes et al *J. Appl. Polym. Sci.* 32, 6073 (1986) and C. Stanescu *Kautsch. Grumm. Kunstat* 32, 647 (1979). A blend of PECH with an epoxy-containing acrylic elastomer to improve co-curability is taught in U.S. Pat. No. 4,511,689.

SUMMARY OF THE INVENTION

It has been discovered that a comb copolymer of a water-insoluble macromer of polyether containing plural repeating units derived from a haloalkylene oxide ("HAO") and a suitable monoolefinically unsaturated monomer, may be used by itself, for example as an adhesive; or, in combination with a matrix polymer, for example the comb is used as an impact modifier or to increase the heat distortion temperature ("HDT"), or as a processing aid for the matrix resin; or, as a compatibilizing agent for two matrix polymers whether these are compatible or not to improve the properties of the blend, for example a comb copolymer of styrene and the MPECH is used to compatibilize normally incompatible polystyrene and poly(vinyl chloride). In each case the comb may be either cured or not cured. Choice of the individual components allows one to derive the benefit of properties of both the comb and the polymer in the blend.

It is therefore a general object of this invention to provide a comb copolymer having a number average mol wt in excess of 10,000, preferably from above 100,000 to 1 million, the comb being formed with a polymerizable olefinically unsaturated monomer and a macromer of poly(HAO) by a free-radical polymerization process.

It has also been discovered that the foregoing comb having a hydrocarbon backbone and pendant chains of water-insoluble poly(HAO), made by free-radical polymerization is useful as a polymer by itself, with or without curing; or, is useful to form a compatible polymer blend with at least one matrix polymer which is compatible with the pendant chains of the comb or containing halogen atoms and co-curable therewith. More particularly, a comb made either by a suspension or an emulsion polymerization process has a sufficiently high mol wt so as to incorporate the properties of both, the backbone and the pendant chains; and to form a compatible blend with one or more matrix polymers which are compatible with either the hydrocarbon polymer backbone, or with the pendant polyether chains of the comb.

It is a specific object of this invention to provide a comb copolymer of a major amount by weight of a polymerizable olefinically unsaturated monomer and a minor amount of a macromer selected from the group consisting of a (i) homopolymer of HAO, (ii) random copolymers of at least one HAO, (iii) block copolymers of ether-b-ether wherein at least one block is of HAO units, provided the comb is made by the aforedescribed free-radical polymerization process, preferably by emulsion or suspension polymerization.

It is a general object of this invention to provide a free-radical polymerization process for producing the comb, comprising, polymerizing in bulk, in a solvent or in an aqueous medium, (i) a macromer of poly(HAO) having a (meth)acrylyl functional head and a Mn greater than 750, and (ii) a monoolefinically unsaturated comonomer, in the presence of an effective amount of (iii) a free-radical initiator.

It is another specific object of this invention to provide both, a suspension and an emulsion polymerization process for the manufacture of a high mol wt comb copolymer of (i) a macromer of HAO-containing polyether having a number average mol wt Mn greater than 750 and an (meth)acrylyl functional head group, and (ii) a free-radical polymerizable olefinically unsaturated monomer, whereby the comb formed has a number average mol wt Mn greater than 10,000, preferably in the range from $5 \times 10^4$ to $10^6$. The suspension or, the emulsion polymerization process for producing the comb, comprises, polymerizing (i)–(iii) in water in the presence of enough surfactant(s) for emulsion polymerization and a suspension agent for suspension polymerization.

It is a specific object of this invention to provide an emulsion polymerization process for producing the foregoing comb, comprising:

(a) preparing in a premix vessel, an aqueous non-acidic premix comprising a first surfactant, a HAO-containing macromer of polyether having a mol wt greater than 750, and, ethylenically unsaturated monomer(s) the in the absence of a co-solvent, the amount of monomer being sufficient to provide on average at least 2, preferably from 5 to 100 repeating units of monomer(s) per macromer unit in the comb copolymer to be formed, and purging with an inert gas, (b) preparing in a reaction vessel, an aqueous reactor precharge comprising a second surfactant, the same or different from the first surfactant, and an electrolyte in an amount sufficient to maintain a desirable ionic charge balance in the absence of a co-solvent, and purging with an inert gas, (c) adding a minor portion by volume of the premix to the reaction vessel, in an inert gas atmosphere, (d) initiating polymerization, in an inert gas atmosphere, by adding a free-radical initiator at a temperature less than 100° C., preferably in the range from 30° C. to 70° C., (e) adding remaining premix in incremental quantities to the reaction vessel until polymerization is essentially completed while maintaining the contents of the reaction vessel in an emulsion at a temperature less than 100° C., preferably in the range from 30° C. to 70° C., and (f) recovering the comb copolymer, preferably by coagulating or spray drying the emulsion.

It is a specific object of this invention to provide a suspension polymerization process for producing the foregoing comb, comprising, (a) preparing in a reactor vessel, an aqueous non-acidic premix comprising a HAO-containing macromer of polyether having a mol wt greater than 750, ethylenically unsaturated monomer(s), and a suspension agent in an amount sufficient to maintain a dispersion of microspheres of said monomer and macromer, in the absence of a co-solvent, the amount of monomer being sufficient to provide on average at least 2, preferably from 5 to 100 repeating units of monomer(s) per macromer unit in the comb copolymer to be formed, and purging with an inert gas, (b) initiating polymerization, in an inert gas atmosphere, by adding a free-radical inititator at a temperature less than 100° C., preferably in the range from 30° C. to 70° C., and, (c) recovering the comb copolymer.

It has been discovered that, depending upon the choice of backbone and pendant chains, and the amount of the macromer in the comb, which is most preferably made by an emulsion or a suspension polymerization process, the comb may yield a rigid plastic, a thermoplastic elastomer or an elastomer, with or without being cured, optionally with appropriate compounding ingredients.

It is another specific object of this invention to provide a partially or fully crosslinked comb in which the crosslinking occurs during free-radical polymerization, or upon mixing with a matrix resin, to product a high mol wt network which nevertheless has compatibility, but with limited miscibility, sufficient to disperse domains of said crosslinked comb blended with a matrix polymer to improve impact resistance or some other property of the blend.

As might be expected, the foregoing processes for providing the macromer produce diverse macromers some of which are more amenable than others for use in the production of the comb with desirably high mol wt, preferably greater than about 10,000, sufficient to provide compatibility between the comb and a single polymer with which it is to be blended, or, between the comb and two or more polymers with which it is to be blended. By "compatible blend", I mean a blend which has mechanical cohesion. Such cohesion is evident upon formation of the blend, and processing it. Such compatible blends may have separately identifiable phases, or a single phase when there is miscibility of the components. A mixture of the comb and polymer(s) may be blended to result in a smooth blend rather than a mixture having the consistency of "cottage cheese". It is not narrowly critical how preferred macromers are made, or whether they are OH terminated, or otherwise end-capped, provided they are effective to produce the combs used to make the blends of this invention.

DETAILED DESCRIPTION OF PREFERRED EMBODIMENTS

The polyhaloether macromer is represented by the structure $$R-(M)_m-Z \tag{LM}$$

wherein R represents the residue of a hydroxyalkyl (meth)acrylate, the structure being written to emphasize the terminal group Z which is derived from either a ring-opening polymerization, or by end-capping or coupling, M represents the polyhaloether having at least one repeating unit derived from a ring-opened haloalkylene oxide, m represents an integer in the range from 2 to about 500, more preferably from 2 to about 300, and, Z is the terminal group the identification of which depends upon the manner in which the macromer is produced, whether, for example, by ring-opening or end-capping. Z is preferably the residue of an end-capping unit selected from the group consisting of

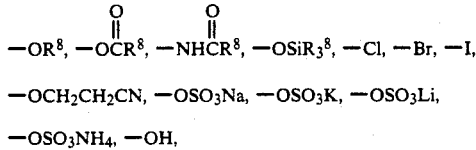

—OCH$_2$CH$_2$CN, —OSO$_3$Na, —OSO$_3$K, —OSO$_3$Li,

—OSO$_3$NH$_4$, —OH, and the like,
wherein R$^8$ is selected from the group consisting of hydrogen, C$_1$–C$_{20}$ alkyl and haloalkyl, and C$_6$–C$_{20}$ aryl and aralkyl.

The macromers of a polyether, end-capped or not end-capped, depending upon its structure, and the length of its chain, may be tailored to provide a wide variety of properties in polymers formed with them in subsequent polymerizations.

The macromer may be a homopolymer or a random copolymer, or a block copolymer. The hydroxyl-terminated (meth)acrylyl macromer of HAO homopolymer has the structure

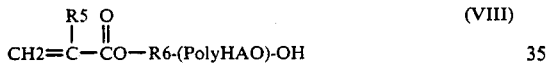

that of block poly(HAO-b-ether) has the structure

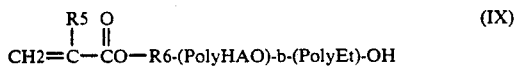

that of block poly(ether-b-HAO) has the structure

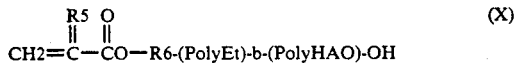

and that of random copolymer of HAO with ether has the structure

wherein the O of the OH group is contributed by the last repeating unit of the polyether;

R5 and R6 have the same connotation as that given above;

(PolyHAO) represents a chain of haloether repeating units; and, (PolyEt) represents a polyether block of repeating units containing no active hydrogen, i.e. no hydrogen attached to oxygen, nitrogen or sulfur, and containing no halogen; and, the macromer has a number average mol wt Mn greater than 500, preferably from 1000 to 30,000.

Correspondingly, a styryl-headed macromer has a structure selected from

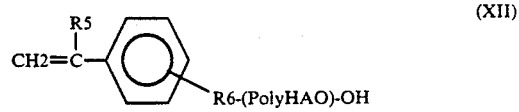

that of block poly(HAO-b-ether) has the structure

that of block poly(ether-b-HAO) has the structure

and that of random copolymer of HAO with ether has the structure

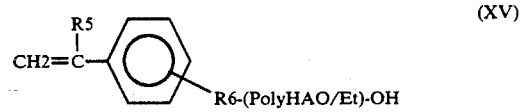

Correspondingly, an allyl-headed macromer has the structure

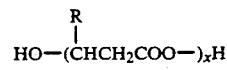

The macromer of this invention may also be obtained by (a) reacting monohydroxy-terminated polyHAO with olefinically unsaturated isocyanate, such as 2-isocyanatoethyl acrylate, (b) esterification of monohydroxy-terminated polyHAO with (meth)acrylic acid with a suitable catalyst, (c) ester exchange reaction of a monohydroxy-terminated polyHAO with (meth)acrylic esters, (d) reacting a monohydroxy-terminated poly-HAO with (meth)acryloyl chloride, or (e) coupling a diisocyanate, one end with a monohydroxy-terminated polyHAO, and the other end with a hydroxyl-containing (meth)acrylic ester such as 2-hydroxyethyl acrylate.

Details for preparing the macromer, homomacromer, or macromer polyether copolymer, or macromer block copolyether are provided in my '978 patent. Typically, a HAO and optionally a cyclic ether (I) or (II) and the alcohol (III) (V) or (VI), each of which is moisture-free, are charged to a jacketed glass-lined reactor provided with a mechanical agitator and fitted with a thermoprobe and condenser. The reactor is purged with nitrogen and warmed to the polymerization temperature. The catalyst, for example, triethyloxonium hexafluorophosphate (TEOP) dissolved in methylene chloride is dripped in and the temperature of the reaction mass is controlled to provide a satisfactory rate of polymerization by raising or lowering the temperature of the circulating medium in the jacket.

The polymerization is generally carried out at a temperature in the range from about 25°–50° C. but this range is not critical, some polymerizations proceeding satisfactorily at as low as 0° C., or lower, and others at as high as 90° C., or higher. The progress of the reaction is monitored by measuring total solids. Upon completion, the polymerization is terminated with aqueous sodium bicarbonate solution, and an antioxidant such as Goodrite ®3114 is added, and the temperature of the mixture raised to about 60° C. and maintained for about an hour. The liquid macromer is separated from the aqueous phase and washed with distilled water at room temperature. Unreacted monomer, if any, may be removed by distillation under vacuum.

A preferred macromer is produced under mild conditions, by the cationic ring-opening polymerization of a HAO in conjunction with a hydroxyalkyl (meth)acrylate and using an oxonium salt as the cationic ring-opening catalyst.

Comb copolymers of macromers of this invention may be derived from a macromer with one or more conventional ethylenically unsaturated monomers. The length to which the backbone is grown may be controlled by conventional means to provide the desired mol wt of the comb copolymer. It will be recognized that the length of each pendant polyether chain is fixed by the vol wt of the macromer.

Monomers suitable for forming cob copolymers include:

(i) $C_2$–$C_{12}$ vinyl monomers such as readily available vinyl chloride, vinyl acetate, acrylonitrile, ethylene, propylene, 4-vinyl pyridine, vinyl pyrrolidone, vinyl benzoic acid, ethyl vinyl ether, salts of vinyl sulfonate, vinyl toluene, vinylidene chloride, N-vinyl carbazole, and the like;

(ii) $C_8$–$C_{16}$ styryl monomers such as styrene, 4-chlorostyrene, alpha-methyl styrene, and the like;

(iii) alpha,beta-ethylenically unsaturated carboxylic acids having from 3 to 8 carbon atoms, and derivatives thereof selected from the group consisting of esters of $C_1$–$C_{20}$ alcohols such as ethyl acrylate, ethyl methacrylate, glycidyl acrylate, butyl acrylate; acrylamide and amides of $C_1$–$C_{20}$ amines such as N,N-dimethylacrylamide; and, metal salts such as sodium acrylate;

(iv) $C_4$–$C_8$ diene monomers such as butadiene and isoprene; and, (v) $C_5$–$C_{10}$ allylically unsaturated monomers such as allyl acetate, and diallylphthalate.

Most preferred is a hydroxyalkyl (meth)acrylate selected from the group consisting of 2-hydroxyethyl (meth)acrylate, hydroxypropyl (meth)acrylate, and 4-hydroxybutyl (meth)acrylate.

A random comb-shaped copolymer of macromer is prepared by polymerizing the macromer of poly(HAO) having any structure (VIII)–(XVI) hereinabove, with an olefinically unsaturated monomer so as to have the structure

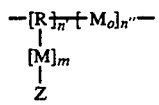   (IV)

wherein $M_o$ represents the olefinically unsaturated monomer;

n' represents an integer in the range from 1 to about $10^4$, preferably 1–$10^3$ and refers to the number of pendant OH-terminated polyester chains; and, n" represents an integer in the range from 1 to about $10^5$, more preferably 1–$10^4$.

Any of the foregoing comb copolymers may be formed with macromers having more than one HAO to form macromers of random copolymers of the polyethers used. Any of the macromers of at least one polyhaloether may also be used as the propagator to form block copolymers described above.

Block copolymers are prepared in which the polyether block has a number average mol wt up to about 30,000, wherein Poly(HAO) represents at least one haloalkyl epoxide, for example, 1-chloro-2,3-epoxypropane (ECH), 3-chloro-4,5-epoxyoctane, and, optionally may include a 1,2-epoxide, for example (i) ethylene oxide, propylene oxide and the like; and (ii) aliphatic or aromatic glycidyl ethers, for example, methyl glycidyl ether, ethyl glycidyl ether, phenyl glycidyl ether and the like.

The terminal OH group of the poly(HAO) macromers (LM) are in some cases required to be end-capped with an end-capping group so that there is no OH group to interfere with the subsequent utilization (in a reaction or copolymerization) of the double bond of the macromer. The end-capping group is not narrowly critical and a variety of esterification and etherification reactions may be used to cap the terminal OH groups, as for example disclosed in U.S. Pat. Nos. 2,998,409 and 3,507,927; British Patents Nos. 748,856; 848,660; 869,323; 877,256; 911,959; inter alia; or, by reacting with an alkylisocyanate as in British Patent No. 924,259; or, by reacting with diazomethane as in British Patent No. 894,439; or, by reacting with acrylonitrile or trialkylchlorosilane.

A preferred comb copolymer is made with a poly(HAO) macromer which contains the (meth)acrylyl head, and, one or more of the copolymerizable monomers preferably selected from (i)–(v), and more preferably from (i)–(iv). Free-radical chain polymerization, commonly used in the art, as described in "Encyclopedia of Polymer Science and Technology" Vol 7, Interscience Publishers, New York (1967), is preferred for all the polymerizations.

The catalyst chosen depends in part upon the particular monomers to be used and also upon the temperature at which the polymerization is to be carried out. It is preferred to carry out the polymerizations, whether in emulsion or suspension, at a temperature below about 70° C., though higher temperatures as high as about 90° C. may be used. In general, the higher the temperature of polymerization with the macromer, the lower the mol wt of the comb formed. Preferred catalysts are the organic and inorganic peroxides, hydroperoxides, persulfates, perborates, the "redox" catalysts, and alkyl borane/oxidizing agent combinations, particularly those which are effective below 70° C. For emulsion polymerization, most preferred is a hydroperoxide catalyst which is ineffective below 70° C. in the absence of a redox catalyst.

Either in emulsion or suspension, the polymerization is best carried out in water in the presence of an effective suspending agent to obtain a granular comb polymer, or in the presence of an efficient dispersing agent to obtain a latex-like emulsion of polymer. Suitable suspending agents include the fatty alcohol sulfates, the alkarylsulfonates, and other such as sodium lauryl sulfate, sodium dodecyl benzene sulfonate, isobutyl naphthalene sodium sulfonate, the sodium salt of N-octadecyl-N-1,2-dicarboxy-ethyl sulfosuccinamate, and the like.

The preferred range for carrying out the polymerization is from about 30° C. to about 70° C.

The comb copolymer formed with the macromer or poly(HAO) and the olefinically unsaturated monomer is used by itself, with or without curing. For example, the comb copolymer formed with MPECH with ethyl acrylate or butyl acrylate or both, is useful as a heat, oil, and ozone resistant elastomer after curing; the comb copolymer formed with MPECH with styrene, either cured or not cured, is a thermoplastic elastomer useful in adhesive applications.

Comb polymers formed with the macromer, and, an olefinically unsaturated monomer which provides a rubbery phase, such as ethyl acrylate, butyl acrylate or butadiene, optionally crosslinked, is used to provide limited miscibility and to control the morphology of the elastomer in the matrix polymer, particularly to improve toughness or elasticity (elongation) in numerous commercially available polymers such as styrene/acrylonitrile, PVC and chlorinated PVC, poly(methylmethacrylate) and other polyesters, polycarbonates, polyurethanes and nylons. In the absence of pendant chains of polyhaloether, polyacrylates are not compatible with the resins, for example with PVC or polyurethane. The comb copolymers may also be used to convert thermoplastic resins into thermoplastic elastomers; for example in styrene/acrylonitrile, PVC, polyurethane, polycarbonate and nylon. The comb copolymers may further be used to modify the physical properties of known thermoplastic elastomers such as block copolymers of styrene-butadiene-styrene. The comb copolymer is thus particularly useful as an impact modifier when it is compatibly blended with a matrix resin present in a major amount by weight relative to the comb in the blend. As little as 1 part comb per 200 parts resinous material may be used, though larger amounts in the range from 3 to 100 parts, preferably from 5 to 50 parts, are more typically used. The compatibility of comb and resin in such a blend, is attributable to the miscibility or compatibility of domains formed by pendant chains of poly(HAO) with the synthetic resinous phase. Additional miscibility, or greater compatibility of resin with such pendant chains may be obtained when the poly(HAO) is blocked to polyether or vice versa, in the pendant chains. The comb copolymer may further be used to blend with a halogen-containing matrix polymer and co-cured.

Comb copolymers formed with the macromer of poly(HAO), and, an olefinically unsaturated monomer, such as styrene, methyl methacrylate or alpha-methyl styrene each of which provides a rigid phase, are useful as modifiers to improve HDT and/or physical strength in numerous commercially available resins. Such HDT improvement is obtained in a blend of "PVC" with the comb of macromer of poly(HAO) and alpha-methyl styrene. The comb of poly(HAO) and styrene improves physical strength in "PVC"; and the comb improves % elongation in blends containing an "ABS terpolymer" (of acrylonitrile, butadiene and styrene). The comb copolymer may further be used to blend with a halogen-containing matrix polymer and co-cured.

The term "PVC" is used generically herein to define not only poly(vinyl chloride), but also analogous polymers, such as poly(vinyl bromide), and chlorinated polyvinyl chloride; poly(vinylidene chloride) its derivatives; and vinyl chloride copolymers or terpolymers having vinyl chloride as the major component (greater than 50% by weight). These copolymers and terpolymers include comonomers of vinyl alkanoates such as vinyl acetate vinylidene halides such as vinylidene chloride; alkyl esters of carboxylic acids such as acrylic acid, ethyl acrylate, and 2-ethylhexyl acrylate; unsaturated hydrocarbons such as ethylene, propylene, and isobutylene; and, allyl compounds, such as allyl acetate.

The term "ABS terpolymer" is used generically herein not only to define a terpolymer but also analogous polymers in which the ABS comonomers have been replaced in whole or in part by analogous comonomers. For example, acrylonitrile is replaced by, or supplemented with methacrylonitrile, ethacrylonitrile, or halogenated acrylonitriles; styrene is replaced by, or supplemented with alpha-methyl styrene, chlorostyrene, or vinyl toluene; butadiene is replaced by, or supplemented with isoprene.

Matrix resins in addition to "PVC" and "ABS terpolymer" which may be modified with the comb include other commonly available commercial polymeric materials. Referring to these generically and with ASTM D4000 acronyms in parentheses, additional polymers include poly(styrene-acrylonitrile) (SAN), poly(styrene-acrylonitrile-butadiene) (ABS), poly(styrene-acrylonitrile-acrylate) (ASA), poly(vinyl acetate), poly(vinylidene chloride-vinylacetate), poly(vinyl methyl ether) (PVME), chlorinated poly(vinyl chloride) (CPVC), chlorinated polyethylene (CPE), PECH, chlorosulfonated polyethylene, bromobutyl rubber, chlorobutyl rubber, polychloroprene, Phenoxy (polyhydroxypropylether of bisphenol A), poly(methylmethacrylate) (PMMA), poly(styrenemaleic anhydride) (SMA), poly(ethylene-vinyl acetate) (EVA), polybutyleneterephthalate (PBT), polyethyleneterephthalate (PET), polyamide (PA), polyurethane (PU), polyolefin (PO) and polycarbonate (PC).

The comb is particularly useful as a compatibilizer to form a blend of a first matrix polymer with a second such material which may be structurally so different from the first as to be incompatible with it. By "incompatible" is meant that any physical blending of as little as 1 part of one resin with the other results in the resins having no mechanical cohesion, and remaining separate and distinct as long as there is no compatibilizing agent present. There is no compatibility of one with the other. The blending of the comb with the first and second resins, together present in a major amount by weight relative to the comb in the blend, results in the formation of a compatible blend which in some instances may also be an essentially homogeneous one. Formation of such a blend is attributable to the first material being compatible with domains formed by pendant chains of the poly(HAO). The compatibilization of the resins with the pendant chains of the comb results in some instances, in a fine dispersion of one polymer in another; in other instances, it results in desired morphology obtained during processing.

The comb polymer is therefore useful as a compatibilizer present in a minor amount by weight, typically 1 to 25 parts, to improve the physical properties of numerous, important compatible polyblends commercially produced by the companies identified hereinbelow in conjunction with their trademarks, indicated with an asterisk. Such blends are of:

ABS/PVC known as Cycovin* by Borg-Warner, Lustran* by Monsanto, and Polyman* by A Schulman Inc.;

ABS/PC known as Bayblend* by Mobay, Pluse* by Dow Chemical, Triax* by Monsanto, and Proloy* by Borg-Warner;

ABS/nylon known as Elemid* by Borg-Warner, and Triax* by Monsanto;

ABS/SMA known as Cadon* by Monsanto;

PVC/ASA known as Geloy* by General Electric;

PVC/acrylic known as by Sumitomo and Kydex* by Rohm & Haas;

PVC/urethane known as Vythene* by Alpha Chem & Plastics;

PVC/CPE known as Hostalite* by American Hoechst;

PVC/nitrile rubber known as Vynite* by Alpha Chem & Plastics, Hycar* by BFGoodrich, and Paracril* by Uniroyal;

PVC/EVA known as Sumifraft* by Sumitomo, and Tennea* by Tenneco;

acetal/elastomer known as Celcon* by Celanese, Duraloy* by Celanese, Delrin* by DuPont, and Ultraform* by BASF;

PBT/PET known as Celanex* by Celanese and Valox* by General Electric;

PBT/elastomer known as Duralox*, Gafite* and Gaftuf* by Celanese, Valox* by General Electric, Ultradur* by BASF;

PBT/SMA known as Dylark* by Arco Chemicals;

PET/PMMA called Ropet* by Rohm & Haas;

PC/PBT/elastomer known as Xenoy* and Valox* by General Electric;

PC/PE known as Lexan* by General Electric and Merlon* by Mobay; PC/PET known as Xenoy* by General Electric and Makroblend* by Mobay;

PC/SMA known as Arloy* by Arco Chemical;

PC/TPU known as Texin* by Mobay;

PC/nylon known as Dexcarb* by Dexter Plastics;

PPO/high impact PS known as Noryl* by General Electric and Prevex* by Borg-Warner;

PPO/polyamide known as Noryl* by General Electric;

SMA/high impact PS known as Dylark* by Arco Chemical;

Nylon/elastomer known as Ultramid* by BASF;

Nylon/ethylene copolymer known as Capron* by Allied Chemical,

Nycoa* by Nylon Corp of America, Grilon* by Emser Industries;

Nylon/EPDM known as Zytel* by DuPont; and,

Nylon/PE known as Selar* by DuPont;

to obtain a desired morphology known to be beneficial. The comb is most preferably used in blends of PVC/ABS; ABS/polycarbonate; ABS/nylon; and PVC/acrylonitrile-butadiene copolymer.

The comb copolymers are also useful as compatibilizers for blending two or more incompatible polymers. For example, comb copolymers formed with macromer and butyl acrylate are useful to form a fine dispersion of poly(butyl acrylate) in PVC to improve toughness of the PVC. Another example is that of comb copolymers formed with macromer and alpha-methyl styrene which are useful to form a fine dispersion of poly(alpha-methyl styrene) in PVC which increases HDT of the PVC.

EXAMPLE 1

Comb Copolymer of Ethyl Acrylate and MPECH (Mn=890)

A premix was made by dissolving 44 g of a first surfactant, Daxad 2A1; and 0.1 g of a redox catalyst, Sequestrene NaFe in 750 ml demineralized water in a 2 liter premix flask. The pH was then adjusted to 6.5 with about 1 g of 50% caustic solution.

300 g of MPECH macromer, Mn=890, formed with 1.98 moles of hydroxyethylacrylate (HEA) and 21.6 moles of ECH are dissolved in 650 g of ethylacrylate. This solution is added to the premix with stirring to form an emulsion while the premix flask is purged with nitrogen.

To a 3-liter reaction flask equipped with a condenser and mechanical stirrer was added 750 ml of demineralized water, 5 g of Daxad 17, 3 g of sodium sulfate, and 262 g of the premixed emulsion of monomers from the premix flask. The reaction flask was then purged with nitrogen.

While under nitrogen, the reaction mixture was warmed to 45° C. and 0.14 g 55% active PHMP, 0.4 g SFS and 0.24 g of 35% active Hampene 100 were added so that the free radical polymerization was initiated. Then the remaining premix emulsion is proportioned into the reaction flask over a period of 2 hr with a metering pump. The total polymerization time is 3 hr and the temperature is maintained at 45° C.

A total solids content of 37.4% was obtained and indicated about 95% monomer conversion. The emulsion was coagulated with 2 wt % solution of Epsom salts in water. The isolated comb copolymer was washed with water and an antioxidant added before it is dried overnight at 60° C. under vacuum. The total weight of solid elastomeric copolymer obtained was 890 g.

The copolymer has a Mooney viscosity of 46 (ML 1+4 at 100° C., ASTM D-1646). Thermal DSC analysis shows that the copolymer has a glass transition temperature $T_g$ of −20° C. and without a melting temperature $T_m$. Elemental analysis shows a total chlorine of 9.1 wt % which is corresponding to 24 wt % of ECH repeating units in the comb copolymer.

EXAMPLE 2

Comb Copolymer of Ethyl Acrylate and MPECH (Mn=890)

In a manner analogous to that illustrated in the foregoing example 1, a premix was made by dissolving 20 g of Gafac PE-510; and 0.1 g of Sequestrene NaFe in 750 ml demineralized water in a 2 liter premix flask. The Ph was then adjusted to 6.5 with about 1.0 g of 50% caustic solution.

125 g of PECH macromer, Mn=890, formed with 1.98 moles of hydroxyethylacrylate (HEA) and 21.6 moles of ECH, are dissolved in 850 g of ethyl acrylate. This solution is added to the premix with stirring to form an emulsion while the premix flask is purged with nitrogen.

To a 3-liter reaction flask equipped with a condenser and mechanical stirrer was added 750 ml of demineralized water, 5.0 g of Daxad 17, 3.0 g of sodium sulfate, and 263 g of the premixed emulsion of monomers from the premix flask. The reaction flask was then purged with nitrogen.

While under nitrogen, the reaction mixture was warmed to 45° C. and 0.24 g of 55% active PHMP, 0.4 g SFS and 0.24 g of 35% active Hampene 100 were added so that the free radical polymerization was initiated. Then the remaining premix emulsion is proportioned into the reaction flask over a period of 140 mins with a metering pump. The total polymerization time is 195 mins and the temperature is maintained at 45° C.

A total solids content of 38.8% was obtained and indicated about 98% monomer conversion. The emulsion was coagulated with 2 wt % solution of Epsom salts in water. The isolated comb copolymer was washed with water and an antioxidant added before it is dried overnight at 60° C. under vacuum. A total of 946 g of solid elastomeric copolymer was obtained.

The copolymer has a Mooney viscosity of 56 (ML 1+4 at 100° C., ASTM D-1646). Thermal DSC analysis shows that the copolymer has a $T_g$ of $-20°$ C. and without a $T_m$. Elemental analysis shows a total chlorine of 4.9 wt % which is corresponding to 13 wt % of ECH repeating units in the comb copolymer.

EXAMPLE 3

Comb Copolymer of Ethyl Acrylate and MPECH (Mn=2180)

In a manner analogous to that illustrated in the foregoing example 1, a premix was made by dissolving 20 g of Gafac PE-510, 44 g of Daxad 2A1, and 0.1 g of Sequestrene NaFe in 750 ml demineralized water in a 2 liter premix flask. The pH was then adjusted to 6.5 with about 1.0 g of 50% caustic solution.

200 g of PECH macromer, Mn=2180, formed with 0.73 moles of hydroxyethylacrylate (HEA) and 21.6 moles of ECH, are dissolved in 750 g of ethyl acrylate. This solution is added to the premix with stirring to form an emulsion while the premix flask is purged with nitrogen.

To a 3-liter reaction flask equipped with a condenser and mechanical stirrer was added 750 ml of demineralized water, 5.0 g of Daxad 17, 3.0 g of sodium sulfate, and 265 g of the premixed emulsion of monomers from the premix flask. The reaction flask was then purged with nitrogen.

While under nitrogen, the reaction mixture was warmed to 45° C. and 0.37 g of 55% active PHMP, 0.4 g SFS and 0.24 g of 35% active Hampene 100 were added so that the free radical polymerization was initiated. Then the remaining premix emulsion is proportioned into the reaction flask over a period of 165 mins with a metering pump. The total polymerization time is 225 mins and the temperature is maintained at 45° C.

A total solids content of 40.2% was obtained and indicated about 100% monomer conversion. The emulsion was coagulated with 2 wt % solution of Epsom salts in water. The isolated comb copolymer was washed with water and an antioxidant added before it is dried overnight at 60° C. under vacuum. A total of 879 g of solid elastomeric copolymer was obtained.

The copolymer has a Mooney viscosity of 29 (ML 1+4 at 100° C., ASTM D-1646). Thermal DSC analysis shows that the copolymer has a $T_g$ of $-20°$ C. and without a $T_m$. Elemental analysis shows a total chlorine of 8.2 wt % which is corresponding to 21 wt % of ECH repeating units in the comb copolymer.

EXAMPLE 4

Comb Copolymer of Ethyl Acrylate and MPECH (Mn=4160)

In a manner analogous to that illustrated in the foregoing example 1, a premix was made by dissolving 20 g of Gafac PE-510, 44 g of Daxad 2A1, and 0.1 g of Sequestrene NaFe in 750 ml demineralized water in a 2 liter premix flask. The pH was then adjusted to 6.5 with about 1.0 g of 50% caustic solution.

200 g of PECH macromer, Mn=4160, formed with 0.34 moles of hydroxyethylacrylate (HEA) and 21.6 moles of ECH, are dissolved in 750 g of ethyl acrylate. This solution is added to the premix with stirring to form an emulsion while the premix flask is purged with nitrogen.

To a 3-liter reaction flask equipped with a condenser and mechanical stirrer was added 750 ml of demineralized water, 5.0 g of Daxad 17, 3.0 g of sodium sulfate, and 265 g of the premixed emulsion of monomers from the premix flask. The reaction flask was then purged with nitrogen.

While under nitrogen, the reaction mixture was warmed to 45° C. and 0.37 g of 55% active PHMP, 0.4 g SFS and 0.24 g of 35% active Hampene 100 were added so that the free radical polymerization was initiated. Then the remaining premix emulsion is proportioned into the reaction flask over a period of 165 mins with a metering pump. The total polymerization time is 225 mins and the temperature is maintained at 45° C.

A total solids content of 39.6% was obtained and indicated about 100% monomer conversion. The emulsion was coagulated with 2 wt % solution of Epsom salts in water. The isolated comb copolymer was washed with water and an antioxidant added before it is dried overnight at 60° C. under vacuum. A total of 817 g of solid elastomeric copolymer was obtained.

The copolymer has a Mooney viscosity of 32 (ML 1+4 at 100° C., ASTM D-1646). Thermal DSC analysis shows that the copolymer has a $T_g$ of $-19°$ C. and without a $T_m$. Elemental analysis shows a total chlorine of 7.1 wt % which is corresponding to 18.5 wt % of ECH repeating units in the comb copolymer. The copolymer is soluble in toluene, methyl ethyl ketone (MEK), and THF. Dilution solution viscosity measured with 0.25 g per 100 g of MEK at 25° C. according to ASTM D2857 shows a value of 2.1 g/ml. The copolymer has Mn of $2.4 \times 10(5)$ with respect to polystyrene standard and Mw/Mn of 2.6 as determined by gel permeation chromatography at 40° C. in THF.

EXAMPLE 5

Comb Copolymer of Ethyl Acrylate, n-Butyl Acrylate and MPECH (Mn=890)

In this example, more chloride curable sites are incorporated into the comb copolymer by adding chloromethyl styrene into the polymerization system. The chloride of chloromethyl styrene is more reactive toward most curing agent than that of ECH repeating units of the pendant chains of the comb copolymer. The example is used to demonstrated the curing behavior of the comb copolymer may be adjust by incorporation of other curable sites, although the comb copolymer made in this example may be too scorch under certain curing conditions. the In a manner analogous to that illustrated in the foregoing example 1, a premix was made by dissolving 22 g of Daxad 2A1 and 0.05 g of Sequestrene NaFe in 275 ml demineralized water in a 1 liter premix flask. The pH was then adjusted to 6.5 with about 0.5 g of 50% caustic solution.

85 g of PECH macromer, Mn=890, formed with 1.98 moles of hydroxyethylacrylate (HEA) and 21.6 moles of ECH, 1.0 g methacrylic acid, and 6.0 g of chloromethyl styrene are dissolved in 150 g of n-butyl acrylate, 250 g of ethyl acrylate. This solution is added to the premix with stirring to form an emulsion while the premix flask is purged with nitrogen.

To a 1-liter reaction flask equipped with a condenser and mechanical stirrer was added 375 ml of demineralized water, 2.5 g of Daxad 17, 1.5 g of sodium sulfate, and 135 g of the premixed emulsion of monomers from the premix flask. The reaction flask was then purged with nitrogen.

While under nitrogen, the reaction mixture was warmed to 45° C. and 0.21 g of 55% active PHMP, 0.2 g SFS and 0.12 g of 35% active Hampene 100 were added so that the free radical polymerization was initiated. Then the remaining premix emulsion is proportioned into the reaction flask over a period of 135 mins with a metering pump. The total polymerization time is 180 mins and the temperature is maintained at 45° C.

A total solids content of 36.8% was obtained and indicated about 93% monomer conversion. The emulsion was coagulated with 2 wt % solution of Epsom salts in water. The isolated comb copolymer was washed with water and an antioxidant added before it is dried overnight at 60° C. under vacuum. A total of 453 g of solid elastomeric copolymer was obtained.

The copolymer has a Mooney viscosity of 46 (ML 1+4 at 100° C., ASTM D-1646). Thermal DSC analysis shows that the copolymer has a $T_g$ of −27° C. and without a $T_m$. Carbon 13 NMR spectra shows the ratio of ethyl acrylate/ butyl acrylate /MPECH is 50/35/15 by wt. in the comb copolymer.

EXAMPLE 6

Comb Copolymer of Ethyl Acrylate, n-Butyl Acrylate and MPECH (Mn=890)

In a manner analogous to that illustrated in the foregoing example 1, a premix was made by dissolving 22 g of Daxad 2A1 and 0.05 g of Sequestrene NaFe in 275 ml demineralized water in a 1 liter premix flask. The pH was then adjusted to 6.5 with about 0.5 g of 50% caustic solution.

85 g of PECH macromer, Mn=890, formed with 1.98 moles of hydroxyethylacrylate (HEA) and 21.6 moles of ECH are dissolved in 225 g of n-butyl acrylate, 175 g of ethyl acrylate. This solution is added to the premix with stirring to form an emulsion while the premix flask is purged with nitrogen.

To a 1-liter reaction flask equipped with a condenser and mechanical stirrer was added 375 ml of demineralized water, 2.5 g of Daxad 17, 1.5 g of sodium sulfate, and 133 g of the premixed emulsion of monomers from the premix flask. The reaction flask was then purged with nitrogen.

While under nitrogen, the reaction mixture was warmed to 45° C. and 0.08 g of 55% active PHMP, 0.2 g SFS and 0.12 g of 35% active Hampene 100 were added so that the free radical polymerization was initiated. Then the remaining premix emulsion is proportioned into the reaction flask over a period of 150 mins with a metering pump. The total polymerization time is 210 mins and the temperature is maintained at 45° C.

A total solids content of 37.5% was obtained and indicated about 96% monomer conversion. The emulsion was coagulated with 2 wt % solution of Epsom salts in water. The isolated comb copolymer was washed with water and an antioxidant added before it is dried overnight at 60° C. under vacuum. A total of 418 g of solid elastomeric copolymer was obtained.

The copolymer has a Mooney viscosity of 41 (ML 1+4 at 100° C., ASTM D-1646). Thermal DSC analysis shows that the copolymer has a $T_g$ of −37° C. and without a $T_m$. Elemental analysis shows a total chlorine of 3.9 wt % which is corresponding to 10.1 wt % of ECH repeating units in the comb copolymer.

EXAMPLE 7

Comb Copolymer of Ethylhexyl Acrylate and MPECH (Mn=1000)

In this example, a partially crosslinked comb copolymer is made by adding a small amount of difunctional crosslinking agent into the polymerization system. In a manner analogous to that illustrated in the foregoing example 1, a premix was made by dissolving 5 g of Gafac PE-510, 22 g of Daxad 2A1, and 0.05 g of Sequestrene NaFe in 350 ml demineralized water in a 1 liter premix flask. The pH was then adjusted to 6.5 with about 0.5 g of 50% caustic solution.

100 g of PECH macromer, Mn=1000, formed with 1.85 moles of hydroxyethylacrylate (HEA) and 21.6 moles of ECH, are dissolved in 350 g of 2-ethylhexyl acrylate and 3.75 g of diethylene glycol diacrylate (Sartomer SR-230) to provide some crosslinking. This solution is added to the premix with stirring to form an emulsion while the premix flask is purged with nitrogen.

To a 1-liter reaction flask equipped with a condenser and mechanical stirrer was added 350 ml of demineralized water, 2.5 g of Daxad 17, 1.5 g of sodium sulfate, and 132 g of the premixed emulsion of monomers from the premix flask. The reaction flask was then purged with nitrogen.

While under nitrogen, the reaction mixture was warmed to 45° C. and 0.19 g of 55% active PHMP, 0.2 g SFS and 0.12 g of 35% active Hampene 100 were added so that the free radical polymerization was initiated. Then the remaining premix emulsion is proportioned into the reaction flask over a period of 150 mins with a metering pump. The total polymerization time is 225 mins and the temperature is maintained at 45° C.

A total solids content of 35.5% was obtained and indicated about 91% monomer conversion. The emulsion was coagulated with 2 wt % solution of Epsom salts in water. The isolated comb copolymer was washed with water and an antioxidant added before it is dried overnight at 60° C. under vacuum. A total of 359 g of very soft elastomeric copolymer was obtained.

Thermal DSC analysis shows that the copolymer has a $T_g$ of −59° C. and without a $T_m$. Elemental analysis shows a total chlorine of 4.8 wt % which is corresponding to 12.6 wt % of ECH repeating units in the comb copolymer. The copolymer is soluble in toluene, methyl ethyl ketone (MEK), and THF. Dilution solution viscosity measured with 0.25 g per 100 g of MEK at 25° C. according to ASTM D2857 shows a value of 2.1 g/ml. The copolymer has Mn of $2.4 \times 10(5)$ with respect to polystyrene standard and Mw/Mn of 2.6 as determined by gel permeation chromatography at 40° C. in THF.

EXAMPLE 8

Comb Copolymer of Ethyl Acrylate and MPECH (Mn=4160)

In this example a comb copolymer with ECH repeating units as pedant chains as high as 38 wt % is obtained. In a manner analogous to that illustrated in the foregoing example 1, a premix was made by dissolving 20 g of Gafac PE-510, 44 g of Daxad 2A1, and 0.1 g of Sequestrene NaFe in 750 ml demineralized water in a 2 liter premix flask. The pH was then adjusted to 6.5 with about 1.0 g of 50% caustic solution.

300 g of PECH macromer, Mn=4160, formed with 0.34 moles of hydroxyethylacrylate (HEA) and 21.6 moles of ECH, are dissolved in 500 g of ethyl acrylate. This solution is added to the premix with stirring to form an emulsion while the premix flask is purged with nitrogen.

To a 3-liter reaction flask equipped with a condenser and mechanical stirrer was added 750 ml of demineralized water, 5.0 g of Daxad 17, 3.0 g of sodium sulfate, and 243 g of the premixed emulsion of monomers from the premix flask. The reaction flask was then purged with nitrogen.

While under nitrogen, the reaction mixture was warmed to 45° C. and 0.35 g of 55% active PHMP, 0.4 g SFS and 0.24 g of 35% active Hampene 100 were added so that the free radical polymerization was initiated. Then the remaining premix emulsion is proportioned into the reaction flask over a period of 165 mins with a metering pump. The total polymerization time is 270 mins and the temperature is maintained at 45° C.

A total solids content of 36.7% was obtained and indicated about 95% monomer conversion. The emulsion was coagulated with 2 wt % solution of Epsom salts in water. The isolated comb copolymer was washed with water and an antioxidant added before it is dried overnight at 60° C. under vacuum. A solid elastomeric copolymer was obtained.

The copolymer has a Mooney viscosity of 24 (ML 1+4 at 100° C., ASTM D-1646). Thermal DSC analysis shows that the copolymer has a $T_g$ of $-23°$ C. and without a $T_m$. Elemental analysis shows a total chlorine of 14.6 wt % which is corresponding to 38 wt % of ECH repeating units in the comb copolymer. The copolymer is soluble in toluene, methyl ethyl ketone (MEK), and THF. Dilution solution viscosity measured with 0.25 g per 100 g of MEK at 25° C. according to ASTM D2857 shows a value of 1.6 g/ml. The copolymer has Mn of $2.9 \times 10^5$ with respect to polystyrene standard and Mw/Mn of 3.0 as determined by gel permeation chromatography at 40° C. in THF.

EXAMPLE 9

Comb Copolymer of Styrene and MPECH (Mn=890)

In a manner analogous to that illustrated in the foregoing example 1, a premix was made by dissolving 10 g of Gafac PE-510 and 0.05 g of Sequestrene NaFe in 350 ml demineralized water in a 1 liter premix flask. The pH was then adjusted to 6.5 with about 0.5 g of 50% caustic solution.

100 g of PECH macromer, Mn=890, formed with 1.98 moles of hydroxyethylacrylate (HEA) and 21.6 moles of ECH, are dissolved in 400 g of styrene. This solution is added to the premix with stirring to form an emulsion while the premix flask is purged with nitrogen.

To a 2-liter reaction flask equipped with a condenser and mechanical stirrer was added 375 ml of demineralized water, 2.5 g of Daxad 17, 1.5 g of sodium sulfate, and 133 g of the premixed emulsion of monomers from the premix flask. The reaction flask was then purged with nitrogen.

While under nitrogen, the reaction mixture was warmed to 50° C. and 0.14 g of 55% active PHMP, 0.2 g SFS and 0.12 g of 35% active Hampene 100 were added so that the free radical polymerization was initiated. Then the remaining premix emulsion is proportioned into the reaction flask over a period of 150 mins with a metering pump. The total polymerization time is 250 mins and the temperature is maintained at 50° C.

A total solids content of 34.3% was obtained and indicated about 87% monomer conversion. The top layer of emulsion was coagulated with 2 wt % solution of Epsom salts in water. The isolated comb copolymer was washed with water and an antioxidant added before it is dried overnight at 60° C. under vacuum. A total of 380 g of comb copolymer as snow-white fine free-flowing particles with a $T_g$ of 95° C. was obtained. Elemental analysis shows a total chlorine of 3.3 wt % which is corresponding to 8.6 wt % of ECH repeating units in the comb copolymer. About 40 g of a sticky paste-like material was recovered from the bottom layer of the emulsion. The material is believed to be rich in unreacted MPECH. It is generally extremely difficult to purify the comb copolymer if it is contaminated with unreacted macromer. Consequently, it is advantageous to have unreacted macromer automatically separated as a bottom layer of the emulsion after polymerization.

EXAMPLE 10

Comb Copolymer of Styrene and MPECH (Mn=890)

In a manner analogous to that illustrated in the foregoing example 1, a premix was made by dissolving 5 g of Sipex SB in 175 ml demineralized water in a 1 liter premix flask. The pH was then adjusted to 6.5 with about 0.5 g of 50% caustic solution.

100 g of PECH macromer, Mn=1000, formed with 1.85 moles of hydroxyethylacrylate (HEA) and 21.6 moles of ECH, are dissolved in 350 g of styrene. This solution is added to the premix with stirring to form an emulsion while the premix flask is purged with nitrogen.

To a 1-liter reaction flask equipped with a condenser and mechanical stirrer was added 400 ml of demineralized water, 0.75 g of Daxad 17, 1.0 g of ammonium carbonate, and 95 g of the premixed emulsion of monomers from the premix flask. The reaction flask was then purged with nitrogen.

While under nitrogen, the reaction mixture was warmed to 65° C. and 3.75 g of ammonium persulfate was added so that the free radical polymerization was initiated. Then the remaining premix emulsion is proportioned into the reaction flask over a period of 135 mins with a metering pump. The total polymerization time is 195 mins and the temperature is maintained at 65° C. The monomer conversion is greater than 85%.

The top layer of emulsion was coagulated with 2 wt % solution of Epsom salts in water. The isolated comb copolymer was washed with water and an antioxidant added before it is dried overnight at 60° C. under vacuum. A comb copolymer as snow-white fine free-flowing particles with $T_g$ of 90° C. was obtained. Elemental analysis shows a total chlorine of 4.2 wt % which is corresponding to 10.8 wt % of ECH repeating units in the comb copolymer. A sticky paste-like material was recovered from the bottom layer of the emulsion. The material with a $T_g$ of about $-30°$ C. is believed to be rich in unreacted MPECH. It is generally extremely difficult to purify the comb copolymer if it is contaminated with unreacted macromer. Consequently, it is advantageous to have unreacted macromer automatically separated as a bottom layer of the emulsion after polymerization. Blends of the Comb Copolymer with Matrix Polymer:

EXAMPLE 11

Blend of Comb Copolymer with PVC

A comb copolymer of acrylate, butyl acrylate, and MPECH from Example 6 was blended with PVC and yielded a uniform blend. Without the pendant chains of PECH, a homopolymer of either ethyl acrylate or butyl acrylate, or a copolymer of ethyl acrylate and butyl acrylate, produces a "cottage cheese" when blended with PVC substrate. Blends containing a minor proportion by weight of the comb contain from 1 to less than 50 parts of comb copolymer mixed with from more than 50 to 99 parts substrate PVC. The ratio of comb to substrate ranges from about 1:49 parts comb to 99:51 parts substrate.

80 parts Geon ®87426 PVC was blended with 20 parts of the comb at 180° C. for 3 min in a Brabender mixer. The blend from the Brabender is then molded at 180° C. and 3000 psi for 2 min to provide a sheet which was sawed into pieces which were tested for their physical properties which are listed in Table 1 below. The physical properties are compared with moldable PVC resin by itself, and the resin which has been modified with Kane Ace 13-22, a commercially available impact modifier. All amounts of components are specified in parts by weight.

TABLE I

| Example 11 | A | B | C | D |
|---|---|---|---|---|
| PVC | 100 | 85 | 80 | 80 |
| Kane Ace 13-22 | — | 15 | — | — |
| Comb | — | — | 20 | 20 |
| Tensile, max, $10^3$ psi | 7.6 | 5.8 | 4.0 | 4.6 |
| Modulus, 105 psi | 4.4 | 3.3 | 2.3 | 2.8 |
| % Elongation | 180 | 140 | 30 | 130 |
| Hardness, Durometer "D" | 84 | 82 | 77 | 77 |
| Tg, °C. | 82 | 83 | 81 | 83 |
| HDT, 264 psi, °C. | 71 | 72 | 69 | 70 |
| Izod impact, ft-lb/in | 0.8 | 15.8 | 11.3 | 14.1 |
| Instrumented Dart impact: | | | | |
| Max force, lb | 459 | 532 | 543 | 548 |
| Total Energy, in-lb | 127 | 178 | 218 | 184 |
| Initiation Energy, in-lb | 78 | 111 | 144 | 125 |
| Propagation Energy, in-lb | 49 | 67 | 74 | 59 |

As is evident, the comb not only makes the acrylic elastomer component of the comb compatible with the PVC, but also improves its impact strength to nearly the same extent as the Kane Ace 13-22 as indicated by Izod and instrumental dart impact tests. Both ductile and brittle failures were observed for samples 11C and 11D. Maximum force of impact is similar to that obtained with the commercial impact modifier (11B). The total impact energy which equals initial energy+propagation energy is higher than unmodified PVC and impact modified PVC with commercial Kane Ace 13-22.

EXAMPLE 12

Blend of Comb Copolymer with CPVC

A comb copolymer of ethyl acrylate, butyl acrylate, and macromer of PECH from Examples 5 and 6 was blended with CPVC and yielded a uniform blend. Without the pendant chains of PECH, a homopolymer of either ethyl acrylate or butyl acrylate, or a copolymer of ethyl acrylate and butyl acrylate, produces a "cottage cheese" when blended with CPVC substrate in the range from 1:50 parts polymer to 99:50 parts substrate CPVC.

90 parts of CPVC (Temprite® 688×512) was blended with 10 parts of comb copolymer, 1.8 parts of Atlastab 777 organotin stabilizer, and 1.0 part of AC6-29A oxidized polyethylene, on a 2-roll mill at 375° F. to yield a smooth and homogeneous blend. The blend was then cubed and injection molded into test specimens for testing. The results of the tests are as follows:

TABLE II

| Component & Test | A | B | C |
|---|---|---|---|
| CPVC, Temprite ® 688 × 512 | 100 | 90 | 90 |
| Atlastab 777 | 1.8 | 1.8 | 1.8 |
| AC 629A | 1.0 | 1.0 | |
| Comb copolymer | | | |
| Example 5 | — | 10 | — |
| Example 6 | — | — | — |
| Tensile, psi | 6650 | 6550 | 7075 |
| % Elongation | 65 | 100 | 125 |
| HDT, °C. (264 psi, 0.125", annealed) | 86 | 90 | — |
| Vicat, °C. (B) | 92 | 93 | 88 |
| Reverse Notched Izod, ft-lb/in | 19 | 40 | — |

It is evident that the ductility of the blend is significantly improved as indicated by the percent elongations.

EXAMPLE 13

Blend of the Comb Copolymer of styrene and MPECH with Epichlorohydrin Homopolymer and Copolymer In this example, elastomeric homopolymer of ECH (Hydrin 100 from BFGoodrich Co) and copolymer of ECH and ethylene oxide (Hydrin 200 from BFGoodrich Co) is physically mixed with the comb copolymer styrene and MPECH of Example 9 to form a uniform thermoplastic elastomeric blend. The mixing was carried out in a brabender mixer at 185° C. for 5 mins. The mixing was easy and uniform. Subsequently, at 6"×6"×⅛" sheet was pressed-molded at 180° C. and 3000 psi for 2 mins. The blends are off-white and opaque. The blends are very sticky when at their melting stage. The mold is difficult to open and the blends are difficult to be removed from the mold upon cooling and required releasing sheets to be placed between the mold and the sample. It indicates that the blends can be used as hot melt adhesives or pressure sensitive adhesive with proper formulation with a known skill of art. The physical properties of the blends are show in Table III. The blends show properties on a material between rigid plastic and elastomer.

TABLE III

| Example 13 | A | B | C | D |
|---|---|---|---|---|
| Comb copolymer of Example 8, wt % | 35 | 55 | 35 | 55 |
| Hydrin 100, wt % | 65 | 45 | — | — |
| Hydrin 200, wt % | — | — | 65 | 45 |
| Hardness, Durometer A | 47 | 75 | 55 | 73 |
| HDT., 264 psi, °C. | ts* | 59 | ts | 47 |
| Tensile, max, psi | 354 | nd** | 199 | 1000 |

*ts - samples are too soft to be measured.
**nd - not determined

EXAMPLE 14

Dynamic Vulcanization of the Blend of the Comb Copolymer of Styrene and MPECH with copolymer of Epichlorohydrin and Ethylene Oxide In this example, elastomeric copolymer of ECH and ethylene oxide (Hydrin 200 from BFGoodrich Co) is dynamically co-cured with the comb copolymer of styrene and MPECH of Example 10 during the mixing. Co-curing is made possible through the pendant chains of PECH of the comb copolymer. In a Brabender mixer 24 parts by wt of comb, 56 parts of Hydrin 200 are mixed at 190C. After 3 min 1 part of stearic acid (processing aid), 0.01 part of Irganox 1010 (antioxidant), 2.0 parts MgO, 1 part Warecure C (85% of 2-mercaptoimidazoline from Ware Chemical Corp) as vulcanizing agent, and 3.0 parts of GRD-90 (red lead from Mobay Chemical Co.) as accelerator were added and mixed for an additional 5 min. After mixing 6"×6"×0.125" thick sheet was press molded at 190C and 3000 psi for 2 min.

Table 4 shows compounding recipe for the hybrid elastomers. Compounding of blends of Hydrin 100 with EA/PECH graft copolymers on the mill went smoothly and the carbon black was well dispersed. The blends were covulcanized with conventional ETU curatives for Hydrin polymers. Blended Hydrin polymers were covulcanized with graft copolymers of macromers through their pendant PECH chains. The blends were cured slower than Hydrin polymers, but most blends did not require post curing as HyTemp polymers.

In the following Tables IV and V are listed the test results for various combinations of cured blends of comb copolymers.

Table IV summarizes physical properties of covulcanized blends of Hydrin 100 and the EA/MPECH graft copolymers. In this study, two comb-shaped copolymers with 24 and 13 wt % of pendant PECH were evaluated. Each copolymer was subsequently blended with Hydrin 100 to make three batches of blends containing 35, 50, and 65 wt % of overall ECH from the combination of Hydrin 100 and pendant chains of PECH of copolymer, respectively. Physical properties of the hybrid elastomers do not show significant difference between two copolymers composed of 24% vs. 13 wt % of pendant PECH. The hybrid elastomers show physical properties intermediate Hydrin and HyTemp. Hybrid elastomers composed of more EA than ECH show properties closer to HyTemp; hybrid elastomers composed of more ECH than EA show properties closer to Hydrin. The ability to balance HyTemp and Hydrin properties provides unique hybrid elastomers.

All the hybrid elastomers give good original properties in tensile and hardness, comparable with Hydrin 100 and HyTemp 4051. The hybrid elastomers also give low temperature properties comparable to Hydrin 100 (freezing pt. of −27° C.), which is about 10° C. lower than HyTemp 4051.

Heat-aging at 175° C. shows that the new hybrid elastomers have much better heat resistance than Hydrin 100. Properties of Hydrin 100 totally fail at 175° C. for 70 hrs, whereas the hybrid elastomers even containing 65 wt % of ECH still maintain good properties and nearly as good as HyTemp. Hybrid copolymers composed of copolymer with more ECH as pendant chains show slightly better heat resistance. The hybrid elastomers show resistance to degradation by heat softening reversion. Resistance to this form of degradation provides much desired improvement in the properties of Hydrin elastomers. The conditions of heat-aging at 150° C. are not severe enough to test the difference.

The hybrid elastomers show fuel resistance not as good as Hydrin but much better than HyTemp. The conditions of the oil-resistance test at 150° C. for 70 and 120 hrs are not severe enough to test the difference. However, the hybrid elastomers show small improvement over HyTemp as indicated by volume change. Hybrid elastomers show resistance to boiling water as good as Hydrin and much better than HyTemp. Hybrid elastomers also show excellent ozone resistance. Dynamic ozone tests showed Hydrin 100 failed in 15 days, whereas hybrid elastomers showed no change after 30 days.

The relatively poor compression set of the hybrid elastomer is expected to improve with a better cure system.

Physical properties of vulcanized hybrid elastomers based on the blends of Hydrin 100 with copolymers of EA and macromers of PECH are summarized as following:

| Properties | Hybrid Elastomer |
|---|---|
| Heat-aging | much better than H100 |
| | nearly as good as HyTemp |
| Fuel resistance | poorer than H100 |
| | much better than HyTemp |
| Oil resistance | slightly better than HyTemp |
| Water resistance | nearly as good as Hydrin, |
| | much improved over HyTemp |
| Ozone resistance | excellent, much improved over Hydrin 100 |
| Compression set | poor |

Table V presents the data in Table IV in a form which allows easier appreciation for some of the properties of the cured blends. Blends #1 and #2 use the same Mn macromer but different amounts of ECH. Blends #3 and #4 use different Mn macromers but essentially the same amount of ECH. #5 and #6 are not blends but the Hydrin and Hytemp respectively. The amount of Hydrin cured with each blend is such that the amount of the ECH and the EA in ech cured blend is the same, namely the mix is 50/50.

The Table V shows that the physical properties of hybrid elastomers of macromers of PECH with Mn in the amounts 890, 2200,; and 4100 have little effect on the properties.

TABLE IV

| PHYSICAL PROPERTIES OF BLENDS OF COMB & ELASTOMER | | | | | | | | |
|---|---|---|---|---|---|---|---|---|
| | HYBRID EA/HYDRIN ELASTOMERS | | | | | | CONTROL | |
| | MPECH - #1 | | | MPECH - #2 | | | Hydrin | Hytemp |
| | ECH: 24 wt % | | | ECH: 13 wt % | | | 100 | 4051 |
| Copolymer of macromer | 45 | 65 | 85 | 40 | 57 | 75 | — | — |
| Hydrin 100 | 55 | 35 | 15 | 60 | 43 | 25 | 100 | — |
| Hytemp 4051 | — | — | — | — | — | — | — | 100 |
| ECH wt % in blend | 65 | 50 | 35 | 65 | 50 | 35 | 100 | 0 |
| Curing Temp., °C. | 170 | 170 | 170 | 170 | 170 | 170 | 160 | 190 |
| Curing Time, min | 45 | 45 | 45 | 45 | 45 | 45 | 45 | 4 |
| Post Curing Temp., °C. | — | — | 150 | — | — | — | — | 177 |
| Post Curing Time, hr | — | — | 2 | — | — | — | — | 4 |
| Monsanto Rheometer - micro die, 1 arc, 100 cpm @ 160° C. ASTM D2084 | | | | | | | | |

TABLE IV-continued
PHYSICAL PROPERTIES OF BLENDS OF COMB & ELASTOMER

| | HYBRID EA/HYDRIN ELASTOMERS | | | | | | CONTROL | |
|---|---|---|---|---|---|---|---|---|
| | MPECH - #1 | | | MPECH - #2 | | | Hydrin | Hytemp |
| | ECH: 24 wt % | | | ECH: 13 wt % | | | 100 | 4051 |
| ML, lb-in | 5.0 | 5.0 | 5.0 | 6.0 | 6.2 | 7.0 | 3.5 | — |
| MH40, lb-in | 27.0 | 22.5 | 16.5 | 29.0 | 25.8 | 21.5 | 36.5 | — |
| ts2, min | 3.0 | 4.0 | 5.0 | 3.0 | 3.8 | 4.1 | 2.7 | — |
| t'90, min | 26.0 | 27.0 | 29.0 | 27.0 | 25.0 | 26.5 | 26.0 | — |
| Monsanto Rheometer - micro die, 1 arc, 100 cpm @ 170° C. ASTM D2084 | | | | | | | | |
| ML, lb-in | 5.0 | 5.2 | 5.8 | 6.3 | 6.8 | 7.1 | 3.8 | 10.3 |
| MH40, lb-in | 30.0 | 24.4 | 17.9 | 32.1 | 27.5 | 22.5 | 42.9 | 48.0 |
| ts2, min | 2.3 | 2.5 | 3.7 | 2.3 | 2.4 | 2.9 | 1.9 | 3.4 |
| t'90, min | 15.5 | 15.2 | 16.3 | 16.1 | 15.8 | 16.2 | 16.0 | 29.3 |
| Mooney Scorch, large rotor @ 125° C. ASTM D1646 | | | | | | | | |
| min | 48.0 | 46.0 | 47.0 | 51.0 | 56.0 | 58.0 | 31.0 | 40.0 |
| T5, min | 7.8 | 10.2 | 14.4 | 8.7 | 9.3 | 10.2 | 7.1 | 21.6 |
| ECH wt % in blend | 65 | 50 | 35 | 65 | 50 | 35 | 100 | 0 |
| T35, min | 12.1 | 15.9 | 27.6 | 12.6 | 12.1 | 14.1 | 12.6 | 34.8 |
| Tg by DSC, °C. | −27.0 | −26.0 | −26.0 | −27.0 | −25.0 | −24.0 | −26.5 | −16.0 |
| Gehman Low Temp. Torsion Test ASTM D1053 | | | | | | | | |
| T100, °C. | −26.1 | −25.0 | −23.9 | −26.0 | — | −24.9 | −26.2 | −15.7 |
| Freeze Pt., °C. | −26.9 | −25.8 | −24.2 | −26.6 | — | −25.6 | −26.6 | −16.9 |
| Original Properties: Tensile Test - TBL, RT, 20"/min ASTM D412 | | | | | | | | |
| 100 modulus, psi | 552 | 438 | 486 | 617 | 552 | 437 | 814 | 553 |
| 200 modulus, psi | 1270 | 1021 | 1215 | 1386 | 1247 | 1063 | 1627 | 1443 |
| 300 modulus, psi | 1869 | 1567 | — | 1990 | 1866 | 1638 | — | — |
| Max. Tensile, psi | 1923 | 1819 | 1617 | 2109 | 2013 | 1887 | 1967 | 1777 |
| Elongation % | 314 | 362 | 263 | 333 | 339 | 376 | 265 | 280 |
| Hardness, Durometer A ASTM D2240 | 70 | 66 | 66 | 71 | 68 | 65 | 78 | 60 |
| 180 Bend Test | pass | pass | pass | pass | pass | pass | pass | pass |
| Air Test Tube, 70 hrs @ 175° C.: ASTM D573 Tensile Test - TBL, RT, 20"/min | | | | | | | | |
| Max. Tensile, psi | 1310 | 1327 | 1536 | 1239 | 1415 | 1634 | 367 | 1550 |
| % change | −32 | −27 | −5 | −41 | −30 | −13 | −81 | −13 |
| Elongation % | 223 | 207 | 205 | 312 | 280 | 249 | 319 | 303 |
| % change | −29 | −43 | −22 | −6 | −17 | −34 | 20 | 8 |
| ECH wt % in blend | 65 | 50 | 35 | 65 | 50 | 35 | 100 | 0 |
| Hardness, Durometer A | 73 | 73 | 74 | 72 | 73 | 73 | 70 | 58 |
| % change | 4 | 11 | 12 | 1 | 7 | 12 | −10 | −3 |
| 180° Bend Test | Pass | Pass | Pass | Pass | Pass | Pass | Pass | Pass |
| Air Test Tube, 168 hrs. @ 150 C.: ASTM D573 Tensile Test - TBL, RT, 20"/min | | | | | | | | |
| Max. Tensile, psi | 1819 | 1771 | 1730 | 1908 | 1889 | 1871 | 1883 | 1601 |
| % change | −5 | −3 | 7 | −10 | −6 | −1 | −4 | 12 |
| Elongation % | 202 | 187 | 182 | 228 | 229 | 214 | 198 | 287 |
| % change | −36 | −48 | −31 | −32 | −32 | −43 | −25 | 12 |
| Hardness, Durometer A | 74 | 74 | 73 | 74 | 74 | 74 | 80 | 50 |
| % change | 6 | 12 | 11 | 4 | 9 | 14 | 3 | 11 |
| 180° Bend | Pass | Pass | Pass | Pass | Pass | Pass | Pass | Pass |
| ASTM Fuel C, 70 hrs @ RT: ASTM D471 Tensile Test - TBL, RT, 20"/min | | | | | | | | |
| Max. Tensile, psi | 855 | 702 | 512 | 875 | 814 | 616 | 1168 | 460 |
| % change | −56 | −61 | −68 | −59 | −60 | −67 | −41 | −68 |
| Elongation % | 144 | 147 | 106 | 150 | 140 | 143 | 165 | 76 |
| % change | −54 | −59 | −60 | −55 | −59 | −62 | −38 | −70 |
| Hardness, Durometer A | 51 | 47 | 48 | 53 | 50 | 43 | 59 | 43 |
| % change | −27 | −29 | −27 | −25 | −26 | −34 | −24 | −17 |
| ECH wt % in blend | 65 | 50 | 35 | 65 | 50 | 35 | 100 | 0 |
| 180° Bend | Pass | Pass | Pass | Pass | Pass | Pass | Pass | Pass |
| % Volume Change | 43 | 48 | 55 | 45 | 50 | 57 | 39 | 99 |
| ASTM Fuel C/Methanol (90/10 by volume), 70 hrs @ RT: ASTM D471 Tensile Test - TBL, RT, 20"/min | | | | | | | | |
| Max. Tensile, psi | 721 | 501 | 265 | 864 | 705 | 439 | 1134 | 173 |
| % change | −63 | −72 | −84 | −59 | −65 | −77 | −42 | −88 |
| Elongation % | 122 | 112 | 57 | 131 | 119 | 98 | 151 | 32 |
| % change | −61 | −69 | −78 | −61 | −65 | −74 | −43 | −88 |
| Hardness, Durometer A | 47 | 43 | 44 | 50 | 47 | 42 | 57 | 45 |
| % change | −33 | −35 | −33 | −30 | −31 | −35 | −27 | −13 |
| 180° Bend | Pass | Pass | Pass | Pass | Pass | Pass | Pass | Pass |

TABLE IV-continued

PHYSICAL PROPERTIES OF BLENDS OF COMB & ELASTOMER

| | HYBRID EA/HYDRIN ELASTOMERS | | | | | | CONTROL | |
|---|---|---|---|---|---|---|---|---|
| | MPECH - #1 | | | MPECH - #2 | | | Hydrin | Hytemp |
| | ECH: 24 wt % | | | ECH: 13 wt % | | | 100 | 4051 |
| % Volume Change | 69 | 95 | 119 | 69 | 89 | 117 | 39 | 187 |
| ASTM NO.3 OIL, 70 hrs @ 150° C.: ASTM D471 | | | | | | | | |
| Tensile Test - TBL, RT, 20″/min | | | | | | | | |
| Max. Tensile, psi | 1969 | 1835 | 1717 | 2214 | 2019 | 1864 | 1941 | 1624 |
| % change | 2 | 1 | 6 | 5 | 0 | −1 | −1 | 13 |
| Elongation % | 188 | 178 | 203 | 200 | 192 | 178 | 178 | 243 |
| % change | −40 | −51 | −23 | −40 | −43 | −53 | −33 | −5 |
| Hardness, Durometer A | 70 | 68 | 64 | 70 | 69 | 67 | 73 | 50 |
| % change | 0 | 3 | −3 | −1 | 1 | 3 | −6 | −4 |
| ECH wt % in blend | 65 | 50 | 35 | 65 | 50 | 35 | 100 | 0 |
| 180° Bend | Pass | Pass | Pass | Pass | Pass | Pass | Pass | Pass |
| % Volume Change | 7 | 6 | 6 | 9 | 8 | 7 | 10 | 16 |
| ASTM NO. 3 Oil, 120 hrs @ 150° C.: ASTM D471 | | | | | | | | |
| Tensile Test - TBL, RT, 20″/min | | | | | | | | |
| Max. Tensile, psi | 1929 | 1972 | 1645 | 2026 | 1991 | 1773 | 1989 | 1582 |
| % change | 0 | 8 | 2 | −4 | −1 | −6 | 1 | 10 |
| Elongation % | 195 | 210 | 204 | 208 | 233 | 181 | 217 | 239 |
| % change | −38 | −42 | −22 | −38 | −31 | −52 | −18 | −7 |
| Hardness, Durometer A | 68 | 67 | 67 | 68 | 66 | 66 | 72 | 52 |
| % change | −3 | 2 | 2 | −4 | −3 | 2 | −8 | 0 |
| 180° Bend | Pass | Pass | Pass | Pass | Pass | Pass | Pass | Pass |
| % Volume Change | 8 | 6 | 6 | 9 | 8 | 7 | 10 | 16 |
| Distilled Water, 70 hrs @ 100° C.: ASTM D471 | | | | | | | | |
| Tensile Test - TBL, RT, 20″/min | | | | | | | | |
| Max. Tensile psi | 1961 | 1585 | 1304 | 2044 | 1687 | 1776 | 2074 | 1162 |
| % change | 2 | −13 | −19 | −3 | −16 | −6 | 5 | −35 |
| Elongation % | 253 | 256 | 214 | 259 | 210 | 260 | 257 | 165 |
| % change | −19 | −29 | −19 | −22 | −38 | −31 | −3 | −41 |
| Hardness, Durometer A | 70 | 60 | 57 | 65 | 64 | 60 | 72 | 50 |
| % change | 0 | −9 | −14 | −8 | −6 | −8 | −8 | −17 |
| ECH wt % in blend | 65 | 50 | 35 | 65 | 50 | 35 | 100 | 0 |
| 180° Bend | Pass | Pass | Pass | Pass | Pass | Pass | Pass | Pass |
| % Volume Change | 9 | 11 | 20 | 9 | 10 | 13 | 6 | 50 |
| Sour ASTM Fuel B, 14 days @ 40° C., 50 peroxide no.: ASTM D471 changed fuel at 1, 2, 3, & 7 days | | | | | | | | |
| Tensile Test - TBL, RT, 20″/min | | | | | | | | |
| Max. Tensile, psi | 431 | 505 | 645 | 448 | 508 | 605 | 206 | 668 |
| % change | −78 | −72 | −60 | −79 | −75 | −68 | −90 | −53 |
| Elongation % | 284 | 326 | 192 | 399 | 350 | 297 | 323 | 157 |
| % change | −10 | −10 | −27 | 20 | 3 | −21 | 22 | −39 |
| Hardness, Durometer A | 32 | 32 | 42 | 28 | 28 | 32 | 28 | 37 |
| % change | −54 | −52 | −36 | −61 | −59 | −51 | −64 | −29 |
| 180° Bend | Pass | Pass | Pass | Pass | Pass | Pass | Pass | Pass |
| Dynamic Ozone Test, 100 ppm, 30 cycles/min, 25% elongation: ASTM 1149 | | | | | | | | |
| 5 days | NC* | NC | NC | NC | NC | NC | NC | NC |
| 6 days | NC | NC | NC | NC | NC | NC | NC | NC |
| 7 days | NC | NC | NC | NC | NC | NC | NC | NC |
| 8 days | NC | NC | NC | NC | NC | NC | NC | NC |
| 13 days | NC | NC | NC | NC | NC | NC | NC | NC |
| 15 days | NC | NC | NC | NC | NC | NC | GF** | NC |
| 21 days | NC | NC | NC | NC | NC | NC | — | NC |
| 30 days | NC | NC | NC | NC | NC | NC | — | NC |
| Compression Set, 22 hrs @ 150 C, buttons, untempered, ASTM D-395-61 | 70 | 76 | 84 | 70 | 73 | 80 | 60 | 10 |

*NC indicates "no change"
**GF indicates "general failure"

TABLE V

PHYSICAL PROPERTIES OF BLENDS OF COMB AND ELASTOMER - EFFECT OF THE LENGTH OF PECH PENDANT CHAINS

| | BLENDS WITH COMBS | | | | CONTROL | |
|---|---|---|---|---|---|---|
| | | | | | Hydrin | Hytemp |
| Comb identif. | #1 | #2 | #3 | #4 | #5 | #6 |
| wt % of ECH | 24 | 13 | 21 | 19 | — | — |
| Mn of MPECH | 890 | 890 | 2200 | 4100 | — | — |

TABLE V-continued
PHYSICAL PROPERTIES OF BLENDS OF COMB AND ELASTOMER - EFFECT OF THE LENGTH OF PECH PENDANT CHAINS

| | BLENDS WITH COMBS | | | | CONTROL | |
| --- | --- | --- | --- | --- | --- | --- |
| | | | | | Hydrin 100 | Hytemp 4051 |
| Comb identif. | #1 | #2 | #3 | #4 | #5 | #6 |
| wt % in blend | 65 | 57 | 75 | 35 | — | — |
| Hydrin 100, wt % | 35 | 43 | 25 | 65 | 100 | — |
| Hytemp 4051, wt % | — | — | — | — | — | 100 |
| ECH/EA by wt in blend | 50/50 | 50/50 | 50/50 | 50/50 | 100/0 | 100/0 |
| Curing temp., °C. | 170 | 170 | 170 | 170 | 160 | 190 |
| Curing time, min | 45 | 45 | 45 | 45 | 45 | 4 |
| Post Curing temp. °C. | — | — | — | — | — | 177 |
| Post Curing time, hr | — | — | — | — | — | 4 |
| Monsanto Rheometer - micro die, 1 arc. 100 cpm @ 170 C. | | | | | | |
| ML, lb-in | 5.2 | 6.8 | 2.8 | 3.2 | 3.8 | 10.3 |
| MH40, lb-in | 24.4 | 27.5 | 12.9 | 14.4 | 42.9 | 48.0 |
| ts2, min | 2.5 | 2.4 | 2.4 | 2.4 | 1.9 | 3.4 |
| t'90, min | 15.2 | 15.8 | 14.8 | 15.2 | 16.0 | 29.3 |
| Mooney Scorch, large rotor @ 125° C. | | | | | | |
| min | 46.0 | 56.0 | 28.0 | 30.0 | 1.0 | 40.0 |
| T5, min | 10.2 | 9.3 | 13.0 | 12.0 | 7.1 | 21.6 |
| T35, min | 15.9 | 12.1 | 19.5 | 19.3 | 12.6 | 34.8 |
| Degradation | none | none | none | none | none | none |
| Tg by DSC, °C. | −26.0 | −25.0 | −24.0 | −23.0 | −26.5 | −16.0 |
| Original Properties: Tensile Test - TBL. RT. 20"/min | | | | | | |
| 100 modulus, psi | 438 | 552 | 394 | 447 | 814 | 553 |
| 200 modulus, psi | 1021 | 1247 | 789 | 893 | 1627 | 1443 |
| 300 modulus, psi | 1567 | 1866 | 1187 | 1320 | — | — |
| Max. Tensile, psi | 1819 | 2013 | 1581 | 1559 | 1967 | 1777 |
| Elongation % | 362 | 339 | 463 | 471 | 265 | 280 |
| Hardness, Durometer A | 66 | 68 | 63 | 62 | 78 | 60 |
| Air Test Tube, 70 hrs @175 C.: Tensile Test - TBL, RT, 20"/min | | | | | | |
| Max. Tensile, psi | 1327 | 1415 | 812 | 878 | 367 | 1550 |
| % Change | −27 | −30 | −49 | −44 | −81 | −13 |
| Elongation % | 207 | 280 | 476 | 440 | 319 | 303 |
| % Change | −43 | −17 | 3 | −7 | 20 | 8 |
| Hardness, Durometer A | 73 | 73 | 62 | 67 | 70 | 58 |
| % Change | 11 | 7 | −2 | 8 | −10 | −3 |
| 180° Bend | Pass | Pass | Pass | Pass | Pass | Pass |
| ASTM Fuel C, 70 hrs @ RT: Tensile Test - TBL. RT, 20"/min | | | | | | |
| Max. Tensile, psi | 702 | 814 | 516 | 480 | 1168 | 460 |
| % Change | −61 | −60 | −67 | −69 | −41 | −68 |
| Elongation % | 147 | 140 | 158 | 129 | 165 | 76 |
| % Change | −59 | −59 | −66 | −73 | −38 | −70 |
| Hardness. Durometer A | 47 | 50 | 35 | 38 | 59 | 43 |
| % Change | −29 | −26 | −44 | −39 | −24 | −17 |
| 180° Bend | Pass | Pass | Pass | Pass | Pass | Pass |
| % Volume Change | 48 | 50 | 40 | 41 | 39 | 99 |
| ASTM NO. 3 OIL, 70 hrs @ 150° C.: Tensile Test - TBL, RT, 20"/min | | | | | | |
| Max. Tensile, psi | 1835 | 2019 | 1900 | 1970 | 1941 | 1624 |
| % Change | 1 | 0 | 20 | 26 | −1 | 13 |
| Elongation % | 178 | 192 | 236 | 216 | 178 | 243 |
| % Change | −51 | −43 | −49 | −54 | −33 | −5 |
| Hardness, Durometer A | 68 | 69 | 66 | 66 | 73 | 50 |
| % Change | 3 | 1 | 5 | 6 | −6 | −4 |
| 180° Bend | Pass | Pass | Pass | Pass | Pass | Pass |
| % Volume Change | 6 | 8 | 8 | 10 | 10 | 16 |
| Distilled Water, 70 hrs @ 100° C.: Tensile Test - TBL,RT, 20"/min | | | | | | |
| Max. Tensile, psi | 1585 | 1687 | 1610 | 1616 | 2074 | 1162 |
| % Change | −13 | −16 | 2 | 4 | 5 | −35 |
| Elongation % | 256 | 210 | 360 | 314 | 257 | 165 |
| % Change | −29 | −38 | −22 | −33 | −3 | −41 |
| Hardness, Durometer A | 60 | 64 | 55 | 57 | 72 | 50 |
| % Change | −9 | −6 | −13 | −8 | −8 | −17 |
| 180° Bend | Pass | Pass | Pass | Pass | Pass | Pass |
| % Volume Change | 11 | 10 | 17 | 7 | 6 | 50 |
| Dynamic Ozone Test, 100 ppm, 30 cycles/min, 25% elongation: | | | | | | |
| 5 days | NC* | NC | NC | NC | NC | NC |
| 6 days | NC | NC | NC | NC | NC | NC |
| 7 days | NC | NC | NC | NC | NC | NC |

TABLE V-continued
PHYSICAL PROPERTIES OF BLENDS OF COMB AND ELASTOMER - EFFECT OF THE LENGTH OF PECH PENDANT CHAINS

| | BLENDS WITH COMBS | | | | CONTROL | |
| --- | --- | --- | --- | --- | --- | --- |
| | | | | | Hydrin 100 | Hytemp 4051 |
| Comb identif. | #1 | #2 | #3 | #4 | #5 | #6 |
| 8 days | NC | NC | NC | NC | NC | NC |
| 13 days | NC | NC | NC | NC | NC | NC |
| 15 days | NC | NC | NC | NC | GF** | NC |
| 21 days | NC | NC | NC | NC | — | NC |
| 30 days | NC | NC | NC | NC | — | NC |
| Compression Set, 22 hrs @ 150 c, buttons, untempered (ASTM D-395-61) | 76 | 73 | 87 | 91 | 60 | 10 |

*NC indicates "no change"
**GF indicates "general failure"

I claim:

1. A process for preparing a polymer blend comprising, depositing at least one matrix resin in a mixing zone, adding thereto a comb copolymer of a polymerizable olefinically unsaturated monomer and a macromer of polyhaloalkylene oxide and mixing it at a sufficiently high temperature and for enough time, until compatibly blended therewith, said matrix resin being present in said mixing zone in a major amount by weight, and said comb copolymer being present in a minor amount by weight, said comb copolymer having a hydrocarbon backbone and said macromer of polyhaloalkylene oxide being represented by the structure $$R—(M)_m—Z \qquad (LM)$$

wherein R represents a monoolefinically unsaturated vinyl group,

M represents at least one ring-opened repeating unit of a poly(haloalkylene oxide), m represents an integer in the range from 2 to about 500, and, Z is a terminal group derived from a ring-opening polymerization or by a coupling reaction, selected from the group consisting of

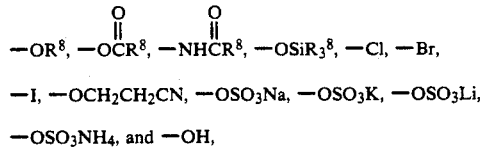

$-I, -OCH_2CH_2CN, -OSO_3Na, -OSO_3K, -OSO_3Li,$ $-OSO_3NH_4,$ and $-OH,$ wherein $R^8$ is selected from the group consisting of hydrogen, $C_1-C_{20}$ alkyl and haloalkyl, and $C_6-C_{20}$ aryl and aralkyl.

2. A comb copolymer represented by the structure $$—[R]_{n'}—[M_o]_{n''}— \qquad (IV)$$
$$\quad | $$
$$[M]_m$$
$$\quad |$$
$$Z$$

wherein $M_o$ represents the olefinically unsaturated monomer;

n' represents an integer in the range from 1 to about $10^4$, and refers to the number of pendant OH-terminated polyester chains; and, n" represents an integer in the range from 1 to about $10^5$;

said macromer of poly(haloalkylene oxide) is represented by the structure $$R—(M)_m—Z \qquad (LM)$$

wherein R represents a monoolefinically unsaturated vinyl group,

M represents at least one ring-opened repeating unit of a poly(haloalkylene oxide), m represents an integer in the range from 2 to about 500, and, Z is a terminal group derived from a ring-opening polymerization or by a coupling reaction; said R represents an acrylyl or methacrylyl group wherein the ethylenic unsaturation is adjacent a carbonyl group; and, said polymerizable olefinically unsaturated monomer is selected from the group consisting of:

(i) $C_2-C_{12}$ vinyl monomers;

(ii) $C_8-C_{16}$ styryl monomers;

(iii) alpha,beta-ethylenically unsaturated carboxylic acids having from 3 to 8 carbon atoms, and derivatives thereof selected from the group consisting of esters of $C_1-C_{20}$ alcohols;

(iv) $C_4-C_8$ diene monomers; and, (v) $C_5-C_{10}$ allylically unsaturated monomers.

3. A polymerization process for producing the comb, comprising, polymerizing in an aqueous medium, (i) a macromer of poly(HAO) having a (meth)acrylyl functional head and a Mn greater than 750, and (ii) a monoolefinically unsaturated comonomer, in the presence of an effective amount of (iii) a free-radical initiator whereby the comb formed has a number average mol wt Mn in the range from greater than 10,000 to about $10^6$.

4. The process of claim 3 wherein said process is carried out in an aqueous emulsion or suspension.

5. The process of claim 4 wherein said emulsion polymerization process comprises, (a) preparing in a premix vessel, an aqueous non-acidic premix comprising a first surfactant, a HAO-containing macromer of polyether having a mol wt greater than 750, and, ethylenically unsaturated monomer(s) in the absence of a cosolvent, the amount of monomer being sufficient to provide on average at least 2, and purging with an inert gas, (b) preparing in a reaction vessel, an aqueous reactor precharge comprising a second surfactant, the same or different from the first surfactant, and an electrolyte in an amount sufficient to maintain a desirable ionic charge balance in the absence of a co-solvent, and purging with an inert gas, (c) adding a minor portion by volume of the premix to the reaction vessel, in an inert gas atmosphere, (d) initiating polymerization, in an inert gas atmosphere, by adding a free-radical initiator at a temperature less than 100° C., (e) adding remaining premix in incremental quantities to the reaction vessel until polymerization is essentially completed while maintaining the contents of the reaction vessel in an emulsion at a temperature less than 100° C., and (f) recovering the comb copolymer.

6. The process of claim 4 wherein said suspension polymerization process comprises, (a) preparing in a reactor vessel, an aqueous non-acidic premix comprising a HAO-containing macromer of polyether having a mol wt greater than 750, ethylenically unsaturated monomer(s), and a suspension agent in an amount sufficient to maintain a dispersion of microspheres of said monomer and macromer, in the absence of a co-solvent, the amount of monomer being sufficient to provide on average at least 2, preferably from 5 to 100 repeating units of monomer(s) per macromer unit in the comb copolymer to be formed, and purging with an inert gas, (b) initiating polymerization, in an inert gas atmosphere, by adding a free-radical initiator at a temperature less than 100° C., preferably in the range from 30° C. to 70° C., and, (c) recovering the comb copolymer.

7. The process of claim 5 wherein said polymerization is initiated at a temperature in the range from 30° C. to 70° C., and said contents of the reaction vessel are maintained in an emulsion at a temperature in the range from 30° C. to 70° C.

8. The process of claim 7 wherein said comb copolymer is recovered by coagulating or spray drying said emulsion.

* * * * *